US011857023B2

(12) United States Patent
Busbee

(10) Patent No.: US 11,857,023 B2
(45) Date of Patent: Jan. 2, 2024

(54) DIGITAL MOLDING AND ASSOCIATED ARTICLES AND METHODS

(71) Applicant: Kornit Digital Technologies Ltd., Rosh HaAyin (IL)

(72) Inventor: Travis Alexander Busbee, Somerville, MA (US)

(73) Assignee: Kornit Digital Technologies Ltd., Rosh HaAyin (IL)

( * ) Notice: Subject to any disclaimer, the term of this patent is extended or adjusted under 35 U.S.C. 154(b) by 228 days.

(21) Appl. No.: 17/320,094

(22) Filed: May 13, 2021

(65) Prior Publication Data

US 2022/0000212 A1 Jan. 6, 2022

Related U.S. Application Data

(63) Continuation-in-part of application No. 17/188,490, filed on Mar. 1, 2021, now Pat. No. 11,647,805,
(Continued)

(51) Int. Cl.
*A43B 1/14* (2006.01)
*A43B 3/00* (2022.01)
(Continued)

(52) U.S. Cl.
CPC ............... *A43B 1/14* (2013.01); *A43B 3/34* (2022.01); *A43B 13/04* (2013.01); *A43B 17/003* (2013.01);
(Continued)

(58) Field of Classification Search
CPC ............... A61B 5/1036; A61B 5/1038; A61B 2562/0247; A61B 5/6807;
(Continued)

(56) References Cited

U.S. PATENT DOCUMENTS 3,053,454 A 9/1962 Waterfill
3,982,663 A 9/1976 Larkin
(Continued)

FOREIGN PATENT DOCUMENTS

CN 103371564 10/2013
CN 103909655 7/2014
(Continued)

OTHER PUBLICATIONS

Official Action dated Apr. 3, 2020 From the US Patent and Trademark Office Re. U.S. Appl. No. 15/907,160. (28 Pages).
(Continued)

*Primary Examiner* — Andre J Allen

(57) ABSTRACT

The present disclosure relates generally to three-dimensionally printed molds, and associated methods, for use in manufacturing articles such as footwear. In some embodiments, for example, a three-dimensionally printed mold may be a master mold that is used to manufacture a secondary mold. The secondary mold may be used, in certain embodiments, to provide a cured material that can be transferred to a substrate, such as a textile, thereby providing the manufactured article. The use of such arrangements can, according to certain embodiments, allow for the production of improved articles of footwear and/or customized articles of footwear.

20 Claims, 15 Drawing Sheets

Related U.S. Application Data which is a continuation of application No. 15/907,137, filed on Feb. 27, 2018, now Pat. No. 10,932,515.

(60) Provisional application No. 62/555,916, filed on Sep. 8, 2017, provisional application No. 62/555,904, filed on Sep. 8, 2017, provisional application No. 62/555,897, filed on Sep. 8, 2017, provisional application No. 62/464,364, filed on Feb. 27, 2017.

(51) Int. Cl.

| | | |
|---|---|---|
| *A43B 1/02* | (2022.01) | |
| *A43B 13/04* | (2006.01) | |
| *B33Y 10/00* | (2015.01) | |
| *B33Y 30/00* | (2015.01) | |
| *B29D 35/12* | (2010.01) | |
| *B29D 35/00* | (2010.01) | |
| *B29C 64/112* | (2017.01) | |
| *B29C 64/209* | (2017.01) | |
| *B29C 64/393* | (2017.01) | |
| *B29C 64/336* | (2017.01) | |
| *A43D 1/02* | (2006.01) | |
| *B33Y 70/00* | (2020.01) | |
| *A43D 1/00* | (2006.01) | |
| *A43D 999/00* | (2006.01) | |
| *B33Y 50/02* | (2015.01) | |
| *A43B 17/00* | (2006.01) | |
| *A43B 23/02* | (2006.01) | |
| *A43B 17/14* | (2006.01) | |
| *A43B 3/34* | (2022.01) | |
| *B33Y 80/00* | (2015.01) | |
| *B29K 75/00* | (2006.01) | |
| *B29K 105/04* | (2006.01) | |
| *B29L 31/50* | (2006.01) | |
| *A43B 5/00* | (2022.01) | |

(52) U.S. Cl.
CPC .......... *A43B 17/14* (2013.01); *A43B 23/0215* (2013.01); *A43D 1/00* (2013.01); *A43D 1/02* (2013.01); *A43D 999/00* (2013.01); *B29C 64/112* (2017.08); *B29C 64/209* (2017.08); *B29C 64/336* (2017.08); *B29C 64/393* (2017.08); *B29D 35/00* (2013.01); *B29D 35/12* (2013.01); *B33Y 10/00* (2014.12); *B33Y 30/00* (2014.12); *B33Y 50/02* (2014.12); *B33Y 70/00* (2014.12); *A43B 5/00* (2013.01); *A43D 2200/60* (2013.01); *B29K 2075/00* (2013.01); *B29K 2105/04* (2013.01); *B29K 2713/00* (2013.01); *B29L 2031/50* (2013.01); *B33Y 80/00* (2014.12)

(58) Field of Classification Search
CPC . A61B 2562/046; A61B 5/112; A61B 5/4528; A61B 5/6892; A61B 5/0816; A61B 5/447; A61B 5/0002; A61B 5/0205; A61B 5/103; A61B 5/11; A61B 5/1126; A61B 5/113; A61B 2560/0214; A61B 5/02055; A61B 5/024; A61B 5/4818; A61B 5/0031; A61B 5/076; A61B 5/1116; A61B 5/1118; A61B 2034/102; A61B 2090/064; A61B 2562/02; A61B 2562/0219; A61B 2562/166; A61B 5/02438; A61B 5/1071; A61B 5/1074; A61B 5/1112; A61B 5/1117; A61B 5/1121; A61B 5/1123; A61B 5/224; A61B 5/4504; A61B 5/4533; A61B 5/486; A61B 5/6811; A61B 5/6812; A61B 5/6829; A61B 5/7242; A61B 5/742; A61B 10/00; A61B 2017/564; A61B 2034/105; A61B 2034/2055; A61B 2090/3983; A61B 2503/04; A61B 2503/08; A61B 2503/10; A61B 2503/40; A61B 2505/00; A61B 2505/09; A61B 2560/0242; A61B 2560/0285; A61B 2560/0412; A61B 2560/0456; A61B 2560/0468; A61B 2560/0475; A61B 2562/0252; A61B 2562/0266; A61B 2562/0271; A61B 2562/0276; A61B 2562/12; A61B 34/10; A61B 34/20; A61B 5/0015; A61B 5/0022; A61B 5/0053; A61B 5/0064; A61B 5/015; A61B 5/021; A61B 5/02444; A61B 5/031; A61B 5/04; A61B 5/055; A61B 5/107; A61B 5/1076; A61B 5/1077; A61B 5/1102; A61B 5/1113; A61B 5/1114; A61B 5/1115; A61B 5/1122; A61B 5/1124; A61B 5/1127; A61B 5/14532; A61B 5/14542; A61B 5/22; A61B 5/4023; A61B 5/412; A61B 5/442; A61B 5/45; A61B 5/4519; A61B 5/4523; A61B 5/4824; A61B 5/4833; A61B 5/4842; A61B 5/4848; A61B 5/4851; A61B 5/4866; A61B 5/6803; A61B 5/6806; A61B 5/681; A61B 5/6831; A61B 5/6833; A61B 5/6843; A61B 5/6846; A61B 5/6887; A61B 5/6891; A61B 5/6893; A61B 5/6895; A61B 5/6898; A61B 5/721; A61B 5/7225; A61B 5/7246; A61B 5/7264; A61B 5/7275; A61B 5/7405; A61B 5/743; A61B 5/7455; A61B 6/03; A61B 6/0407; A61B 90/36; A61B 90/361; B33Y 10/00; B33Y 30/00; B33Y 70/00; B33Y 80/00; B33Y 50/02; B33Y 70/10
USPC .......................................................... 73/172
See application file for complete search history.

(56) References Cited

U.S. PATENT DOCUMENTS

| | | |
|---|---|---|
| 4,078,576 A | 3/1978 | Punch et al. |
| 4,708,292 A | 11/1987 | Gammons |
| 5,335,992 A | 8/1994 | Holl |
| 5,385,953 A | 1/1995 | McClellan |
| 5,820,354 A | 10/1998 | Wild et al. |
| 5,979,787 A | 11/1999 | Scarpa |
| 8,333,330 B2 | 12/2012 | Schuetze et al. |
| 8,758,263 B1 | 6/2014 | Rahimian et al. |
| 9,375,051 B2 | 6/2016 | Doremus et al. |
| 9,421,565 B2 | 8/2016 | Lewis et al. |
| 9,453,142 B2 | 9/2016 | Rolland et al. |
| 9,491,987 B2 | 11/2016 | Antonelli et al. |
| 9,788,600 B2 | 10/2017 | Wawrousek et al. |
| 10,076,876 B2 | 9/2018 | Mark et al. |
| 10,119,108 B2 | 11/2018 | Maggiore |
| 10,254,499 B1 | 4/2019 | Cohen et al. |
| 10,279,581 B2 | 5/2019 | Ashcroft |
| 10,327,700 B2 | 6/2019 | Lee et al. |
| 10,442,910 B2 | 10/2019 | Baghdadi |
| 10,716,358 B2 | 7/2020 | Reinhardt et al. |
| 10,806,208 B2 | 10/2020 | Buesgen et al. |
| 10,932,515 B2 | 3/2021 | Busbee |
| 2004/0126254 A1 | 7/2004 | Chen et al. |
| 2004/0187714 A1 | 9/2004 | Napadensjy et al. |
| 2006/0035034 A1 | 2/2006 | Matsumoto et al. |
| 2006/0283044 A1 | 12/2006 | Lacey |
| 2008/0026190 A1 | 1/2008 | King et al. |
| 2008/0132597 A1 | 6/2008 | Nozawa et al. |

(56) References Cited

U.S. PATENT DOCUMENTS

| | | |
|---|---|---|
| 2009/0143765 A1 | 6/2009 | Slocum et al. |
| 2010/0140852 A1 | 6/2010 | Kritchman et al. |
| 2011/0189785 A1 | 8/2011 | Gutmann et al. |
| 2011/0315291 A1 | 12/2011 | Abad et al. |
| 2012/0023776 A1 | 2/2012 | Skaja et al. |
| 2012/0260527 A1 | 10/2012 | Noh |
| 2013/0320598 A1 | 12/2013 | Atkins et al. |
| 2014/0020191 A1 | 1/2014 | Jones et al. |
| 2014/0020192 A1 | 1/2014 | Jones et al. |
| 2014/0027952 A1 | 1/2014 | Fan et al. |
| 2014/0137965 A1 | 5/2014 | Truitt et al. |
| 2014/0182170 A1 | 7/2014 | Wawrousek et al. |
| 2015/0230562 A1 | 8/2015 | Jones et al. |
| 2015/0336298 A1 | 11/2015 | Dean |
| 2015/0352787 A1 | 12/2015 | Humbert et al. |
| 2016/0021969 A1 | 1/2016 | Lettow, II et al. |
| 2016/0107396 A1 | 4/2016 | Berman |
| 2016/0192741 A1 | 7/2016 | Mark |
| 2016/0205963 A1 | 7/2016 | Saal et al. |
| 2016/0219982 A1 | 8/2016 | Waatti |
| 2016/0235158 A1 | 8/2016 | DesJardins et al. |
| 2016/0299047 A1 | 10/2016 | Molla et al. |
| 2016/0331082 A1 | 11/2016 | Weidl |
| 2016/0374428 A1 | 12/2016 | Kormann et al. |
| 2016/0374431 A1 | 12/2016 | Tow |
| 2017/0050374 A1 | 2/2017 | Minardi et al. |
| 2017/0122322 A1 | 5/2017 | Zinniel et al. |
| 2017/0164899 A1 | 6/2017 | Yang et al. |
| 2017/0203406 A1 | 7/2017 | Ganapathiappan et al. |
| 2017/0238870 A1 | 8/2017 | Lee et al. |
| 2017/0251713 A1 | 9/2017 | Warner et al. |
| 2017/0265582 A1 | 9/2017 | Walker et al. |
| 2017/0319368 A1 | 11/2017 | Selner |
| 2018/0029291 A1 | 2/2018 | Matzner et al. |
| 2018/0133670 A1 | 5/2018 | Lewis et al. |
| 2018/0353308 A1 | 12/2018 | Tompkins |
| 2018/0369910 A1 | 12/2018 | Guenther et al. |
| 2019/0037960 A1 | 2/2019 | Busbee |
| 2019/0037961 A1 | 2/2019 | Busbee et al. |
| 2019/0037969 A1 | 2/2019 | Busbee et al. |
| 2019/0039299 A1 | 2/2019 | Busbee et al. |
| 2019/0039309 A1 | 2/2019 | Busbee et al. |
| 2019/0039310 A1 | 2/2019 | Busbee et al. |
| 2019/0039311 A1 | 2/2019 | Busbee et al. |
| 2019/0200703 A1 | 7/2019 | Mark |
| 2019/0246741 A1 | 8/2019 | Busbee et al. |
| 2019/0248089 A1 | 8/2019 | Busbee et al. |
| 2019/0283394 A1 | 9/2019 | Ashcroft et al. |
| 2019/0322884 A1 | 10/2019 | Bloomfield et al. |
| 2019/0387839 A1 | 12/2019 | Dua et al. |
| 2020/0181351 A1 | 6/2020 | Bailey et al. |
| 2021/0037908 A1 | 2/2021 | Busbee |
| 2021/0039306 A1 | 2/2021 | Busbee |
| 2021/0039399 A1 | 2/2021 | Busbee |
| 2021/0186151 A1 | 6/2021 | Gross |
| 2021/0321713 A1 | 10/2021 | Busbee |
| 2022/0000212 A1 | 1/2022 | Busbee |

FOREIGN PATENT DOCUMENTS

| | | |
|---|---|---|
| CN | 103909655 A | 7/2014 |
| CN | 104191616 | 12/2014 |
| CN | 104191616 A | 12/2014 |
| CN | 104428126 | 3/2015 |
| CN | 104786506 | 7/2015 |
| CN | 104786506 A | 7/2015 |
| CN | 104875389 | 9/2015 |
| CN | 104875389 A | 9/2015 |
| CN | 105073363 | 11/2015 |
| CN | 105142450 | 12/2015 |
| CN | 205058637 | 3/2016 |
| CN | 205058637 U | 3/2016 |
| CN | 205741716 | 11/2016 |
| CN | 205741716 U | 11/2016 |
| CN | 106331236 | 1/2017 |
| CN | 106331236 A | 1/2017 |
| CN | 110431000 | 11/2019 |
| CN | 113271803 | 8/2021 |
| EP | 3061545 | 8/2016 |
| GB | 2508204 | 5/2014 |
| WO | WO 2014/100462 | 6/2014 |
| WO | WO 2016/125170 | 8/2016 |
| WO | WO-2016/170030 | 10/2016 |
| WO | WO 2016/191329 | 12/2016 |
| WO | WO 2016/191329 A1 | 12/2016 |
| WO | WO 2016/209872 | 12/2016 |
| WO | WO 2016/209872 A1 | 12/2016 |
| WO | WO 2018/115874 | 6/2018 |
| WO | WO 2018/115874 A1 | 6/2018 |
| WO | WO 2018/144121 | 8/2018 |
| WO | WO 2018/157146 | 8/2018 |
| WO | WO 2022/047020 | 3/2022 |

OTHER PUBLICATIONS

Official Action dated Jan. 25, 2021 From the US Patent and Trademark Office Re. U.S. Appl. No. 15/907,160. (29 Pages).
Official Action dated Aug. 27, 2021 From the US Patent and Trademark Office Re. U.S. Appl. No. 15/907,160. (12 Pages).
Notice of Allowance dated Jun. 17, 2022 from US Patent and Trademark Office Re. U.S. Appl. No. 17/003,118. (9 pages).
Notice of Allowance dated Feb. 28, 2023 From the US Patent and Trademark Office Re. U.S. Appl. No. 17/188,490. (10 Pages).
International Preliminary Report on Patentability dated Sep. 6, 2019 From the International Bureau of WIPO Re. Application No. PCT/US2018/019993. (11 Pages).
International Search Report and the Written Opinion dated Dec. 5, 2021 From the International Searching Authority Re. Application No. PCTIUS2021/047745. (24 Pages).
International Search Report and the Written Opinion dated Jul. 6, 2018 From the International Searching Authority Re. Application No. PCT/IL2018/020000. (15 Pages).
International Search Report and the Written Opinion dated Jun. 8, 2018 From the International Searching Authority Re. Application No. PCT/US2018/019993. ( 15 Pages).
International Search Report and the Written Opinion dated Jun. 8, 2018 From the International Searching Authority Re. Application No. PCTUS2018/01999. (13 Pages).
International Search Report and the Written Opinion dated Dec. 9, 2021 From the International Searching Authority Re. Application No. PCT/US2021/047738. (9 Pages).
Notice of Allowance dated Mar. 1, 2022 From the US Patent and Trademark Office Re. U.S. Appl. No. 17/003,118. (16 Pages).
Notice of Allowance dated Dec. 9, 2020 From the US Patent and Trademark Office Re. U.S. Appl. No. 15/907,137. (13 Pages).
Official Action dated Oct. 7, 2019 From the US Patent and Trademark Office Re. U.S. Appl. No. 15/907,147. (9 Pages).
Official Action dated Oct. 8, 2021 From the US Patent and Trademark Office Re. U.S. Appl. No. 17/003,118. (7 Pages).
Official Action dated Feb. 17, 2022 From the US Patent and Trademark Office Re. U.S. Appl. No. 15/907,147. (12 Pages).
Official Action dated May 18, 2020 From the US Patent and Trademark Office Re. U.S. Appl. No. 15/907,137. (9 Pages).
Official Action dated Jul. 24, 2020 From the US Patent and Trademark Office Re. U.S. Appl. No. 15/907,147. (7 Pages).
Official Action dated Apr. 29, 2021 From the US Patent and Trademark Office Re. U.S. Appl. No. 15/907,147. (7 Pages).
Restriction Official Action dated Feb. 14, 2020 From the US Patent and Trademark Office Re. U.S. Appl. No. 15/907,137. (7 Pages).
Supplementary European Search Report and the European Search Opinion dated Nov. 6, 2020 From the European Patent Office Re. Application No. 18757136.9. (10 Pages).
AirBoss Amtel Restructuring—Again, Rubber New: 4P., Sep. 8, 2009.
Bauman "Surface-Modified Rubber Particles for Polyurethanes", Polymer Science and Technology Series book series (POLS, 1: 584-589, 1998.

(56) References Cited

OTHER PUBLICATIONS

Piszczyk et al. "Polyurethane/Ground Tire Rubber Composite Foams Based on Polyglycerol: Processing, Mechanical and Thermal Properties", Journal of Reinforced Plastics and Composites: 1-10, Apr. 2, 2015.
Sanjay "Effect of Crumb-Rubber Particle Size on Mechanical Response of Polyurethane Foam Composites", Oklahoma State University. ProQuest Dissertations Publishing, 1567387, 12P, 2014.
Shan et al. "Study of Flexible Polyurethane Foams Reinforced with Coir Fibres and Tyre Particles", International Journal of Applied Physics and Mathematics, 2(2): 123-130, Mar. 2012.
Subramaniyan et al. "Mechanical Behavior of Polyurethane Composite Foams from Kenaf Fiber and Recycled Tire Rubber Particles", Applied Mechanics and Materials, 315: 861-866, Apr. 2013.
Notification of Office Action and Search Report dated Aug. 25, 2021 From the State Intellectual Property Office of the People's Republic of China Re. Application No. 201880027271.2 and Its Translation of Office Action Into English. (52 Pages).
Notification of Office Action and Search Report dated Jun. 16, 2022 From the State Intellectual Property Office of the People's Republic of China Re. Application No. 201880027271.2 and Its Translation Into English. (29 Pages).
U.S. Appl. No. 15/907,122, filed Feb. 27, 2018, Busbee et al.
U.S. Appl. No. 15/907,128, filed Feb. 27, 2018, Busbee et al.
U.S. Appl. No. 15/907,160, filed Feb. 27, 2018, Busbee et al.
U.S. Appl. No. 15/907,147, filed Feb. 27, 2018, Busbee et al.
U.S. Appl. No. 15/907,085, filed Feb. 27, 2018, Busbee et al.
U.S. Appl. No. 15/907,100, filed Feb. 27, 2018, Busbee et al.
U.S. Appl. No. 17/188,490, filed Mar. 1, 2021, Busbee.
U.S. Appl. No. 17/003,089, filed Aug. 26, 2020, Busbee.
U.S. Appl. No. 17/003,106, filed Aug. 26, 2020, Busbee.
U.S. Appl. No. 17/003,118, filed Aug. 26, 2020, Busbee.
PCT/US2021/047745, Dec. 5, 2021, International Search Report and Written Opinion.
PCT/US2021/047738, Dec. 9, 2021, International Search Report and Written Opinion.
International Search Report and Written Opinion for International Application No. PCT/US2021/047745 dated Dec. 5, 2021.
International Search Report and Written Opinion for International Application No. PCT/US2021/047738 dated Dec. 9, 2021.
[No Author Listed], Amtel restructuring—again. Rubber News. Sep. 8, 2009. 4 pages.
Bauman, Surface-modified rubber particles for polyurethanes. Plastic Additives. Polymer Science and Technology Series. 1998;1:584-9.
Piszczyk et al., Polyurethane/ground tire rubber composite foams based on polyglycerol: Processing, mechanical and thermal properties. Journal of Reinforced Plastics and Composites. 2015;10 pages.
Sanjay, Effect of Crumb-Rubber Particle Size on Mechanical Response of Polyurethane Foam Composites. Oklahoma State University Masters Thesis. Jul. 2014. 55 pages.
Shan et al., Study of Flexible Polyurethane Foams Reinforced with Coir Fibres and Tyre Particles. International Journal of Applied Physics and Mathematics. 2012;2:123.
Subramaniyan et al., Mechanical Behavior of Polyurethane Composite Foams from Kenaf Fiber and Recycled Tire Rubber Particles. Applied Mechanics and Materials. 2013;315:861-6. Epub Apr. 10, 2013.
Decision of Rejection dated Nov. 18, 2022 From the State Intellectual Property Office of the People's Republic of China Re. 201880027271.2. (18 Pages).
Official Action dated Sep. 8, 2022 from US Patent and Trademark Office Re. U.S. Appl. No. 17/188,490. (31 pages).
Cao et al. "Material Modern Design Theory and Method", Harbin Institute of Technology Press, p. 7, Apr. 30, 2002.
International Preliminary Report on Patentability dated Mar. 9, 2023 From the International Bureau of WIPO Re. Application No. PCT US2021/047738. (6 Pages).

DIGITAL MOLDING AND ASSOCIATED ARTICLES AND METHODS

RELATED APPLICATIONS

This application is a continuation-in-part of U.S. application Ser. No. 17/188,490, filed Mar. 1, 2021, which is a continuation of U.S. application Ser. No. 15/907,137, filed Feb. 27, 2018, which claims priority under 35 U.S.C. § 119(e) to U.S. Provisional Application No. 62/464,364, filed Feb. 27, 2017, U.S. Provisional Application No. 62/555,897, filed Sep. 8, 2017, U.S. Provisional Application No. 62/555,904, filed Sep. 8, 2017, and U.S. Provisional Application No. 62/555,916, filed Sep. 8, 2017, each of which are incorporated herein by reference in their entirety for all purposes.

FIELD

The present disclosure relates generally to three-dimensionally printed molds, and associated methods, for use in manufacturing articles such as footwear.

BACKGROUND

Footwear is typically mass produced from in large batches and with the use of complex supply chains. As a result, portions of a single article of footwear with different properties are typically formed from uniform components with standard sizes and properties which are adhered together or disposed on one another. This lowers the quality of the resultant footwear and makes its customization for specific users challenging. Accordingly, improved articles for use in footwear that allow greater integration and/or customization of different components and associated methods may be advantageous.

SUMMARY

The present disclosure generally relates to systems and methods involving three-dimensionally printed molds for use in manufacturing articles. The present subject matter of the present invention involves, in some cases, interrelated products, alternative solutions to a particular problem, and/or a plurality of different uses of one or more systems and/or articles.

A method of curing a liquid is described herein. The method may comprise, in some embodiments, dispensing a curable liquid into a mold through a printing nozzle disposed on a robotic gantry, wherein a composition of the curable liquid is varied between at least a first portion of the composition and a second portion of the composition; and at least partially curing the curable liquid to provide an at least partially cured material.

In some embodiments, the robotic gantry is configured to move the printing nozzle relative to the mold.

According to certain embodiments, the method further comprises depositing a pigment-containing component into the mold prior to dispensing the curable liquid.

In certain embodiments, the method further comprises transferring the at least partially cured material from the mold to a substrate such that the at least partially cured material is adhered to the substrate, thereby providing an article.

According to some embodiments, at least partially curing and transferring occur substantially simultaneously.

In some embodiments, the at least partially cured material is substantially fully cured after transferring.

According to certain embodiments, the substrate comprises a textile, leather, or polymer.

In some embodiments, a tensile elastic modulus of the at least partially cured material is varied by at least 10% between at least a first portion of the at least partially cured material and a second portion of the at least partially cured material.

In certain embodiments, the mold comprises an elastomer or silicone.

According to some embodiments, the curable liquid comprises polyurethane or polyurea.

According to certain embodiments, the curable liquid comprises a catalyst.

In some embodiments, a concentration of the catalyst is varied between the first portion of the composition and the second portion of the composition.

A method of manufacturing an article is described herein. In certain embodiments, the method comprises casting an elastomer into a first mold to provide a second mold; dispensing a curable liquid into the second mold; at least partially curing the curable liquid to provide an at least partially cured material; and transferring the at least partially cured material from the second mold to a substrate such that the at least partially cured material is adhered to the substrate, thereby providing the article.

According to some embodiments, the first mold is manufactured by additive manufacturing.

In certain embodiments, the method further comprises coating at least a portion of the curable liquid with a thermoplastic powder after dispensing the curable liquid into the second mold and before fully curing the curable liquid.

According to certain embodiments, the method further comprises placing the second mold onto a rigid base prior to dispensing the curable liquid.

In some embodiments, the curable liquid is dispensed into the second mold through a printing nozzle disposed on a robotic gantry.

According to some embodiments, the robotic gantry is configured to move the printing nozzle relative to the second mold.

In certain embodiments, the substrate comprises a textile, leather, or polymer.

According to certain embodiments, transferring the at least partially cured material to the substrate comprises pressing the substrate against the at least partially cured material for a period of at least five seconds.

In some embodiments, at least partially curing and transferring occur substantially simultaneously.

According to some embodiments, transferring the at least partially cured material to the substrate occurs while the at least partially cured material is in the second mold.

In certain embodiments, the method further comprises peeling the at least partially cured material adhered to the substrate out of the second mold.

According to some embodiments, the at least partially cured material is substantially fully cured after transferring.

In some embodiments, a composition of the curable liquid is varied between at least a first portion of the composition and a second portion of the composition.

In certain embodiments, a tensile elastic modulus of the at least partially cured material is varied by at least 10% between at least a first portion of the at least partially cured material and a second portion of the at least partially cured material.

According to certain embodiments, the method comprises depositing a pigment-containing component into the second mold prior to dispensing the curable liquid.

In some embodiments, the elastomer and/or the second mold comprises silicone.

According to certain embodiments, the curable liquid comprises polyurethane.

In certain embodiments, the first mold is manufactured by stereolithography.

According to some embodiments, the first mold is manufactured by a thermoplastic powder sintering based additive manufacturing process, a binderjetting based additive manufacturing process, a digital light projection based additive manufacturing process, or an inkjet based additive manufacturing process.

According to certain embodiments, the curable liquid comprises polyurea.

In some embodiments, the curable liquid comprises a catalyst.

According to some embodiments, a concentration of the catalyst is varied between the first portion of the composition and the second portion of the composition.

A method of manufacturing a colored article is described. In some embodiments, the method comprises depositing one or more pigment-containing components into a mold; dispensing a curable liquid onto the one or more pigment-containing components; at least partially curing the curable liquid to provide an at least partially cured material associated with the one or more pigment-containing components; and transferring the at least partially cured material associated with the one or more pigment-containing components from the mold to a substrate such that the at least partially cured material associated with the one or more pigment-containing components is adhered to the substrate, thereby providing the colored article.

According to certain embodiments, a layer of the curable liquid is dispensed into the mold prior to depositing the one or more pigment-containing components into the mold.

In some embodiments, the at least partially cured material is bound to the one or more pigment-containing components.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
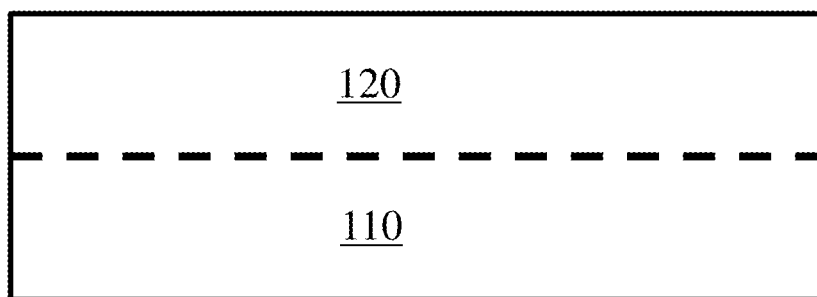
FIGS. 1A-1C illustrate 3D-printed articles according to certain embodiments of the invention.

Inventive three-dimensionally printed (3D-printed) articles for use in footwear or other applications, and associated methods, are generally described herein. In some embodiments, the 3D-printed article may comprise one or more features that are challenging or impossible to obtain in articles manufactured by other techniques. As an example, the 3D-printed article may be a single integrated material which comprises a gradient in one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) between two or more portions of the material. This may be achieved using a 3D printing process by printing the 3D-printed article using an ink that can be dynamically changed as the article is printed (by, e.g., changing the ratios of different components that make up the ink, changing the temperature of the ink, and the like). In some embodiments, the 3D-printed article may have one or more features that are preferred by users of the 3D-printed article or footwear of which the 3D-printed article is one component. For example, the 3D-printed article may be a single integrated material and/or may lack seams, adhesives, and other features that are typically used to join two or more materials together. These and other 3D-printed articles may be more comfortable for users, and/or may be less subject to degradation or damage during normal usage of the article.

It should be understood that references herein to 3D-printed articles may encompass articles that include more than one layer (e.g., articles that comprise multiple layers printed on top of each other) and/or may encompass articles that include a single layer (e.g., articles in which a single layer of material has been printed). 3D-printed articles may encompass articles printed from 3D-printers and/or articles that extend macroscopically in three dimensions (e.g., with a minimal extent in each dimension of 50 microns, 100 microns, 200 microns, 500 microns, or 1 mm). Similarly, 3D-printing may encompass printing articles that include more than one layer and/or printing articles that include a single layer. 3D-printing may encompass printing articles on 3D-printers, printing articles extend macroscopically in three dimensions (e.g., with a minimal extent in each dimension of 50 microns, 100 microns, 200 microns, 500 microns, or 1 mm).

It should also be understood that articles other than 3D-printed articles and printing methods other than 3D-printing are also contemplated. For example, some embodiments relate to articles that have one or more of the features of the 3D-printed articles described herein (e.g., a gradient in one or more properties) but are not 3D-printed articles. Some articles may include both one or more 3D-printed components and one or more non-3D-printed components. Similarly, some embodiments relate to methods that have one or more features of the methods described herein (e.g., may comprise employing a multi-axis deposition system) but which do not include a 3D-printing step. Some methods may include both one or more 3D-printing steps and one or more non-3D-printing steps.

Certain methods (e.g., methods including exclusively 3D-printing steps, methods including exclusively non-3D printing steps, methods including both 3D-printing steps and non-3D-printing steps) comprise depositing one or more film(s) onto a 3D-surface. Some or all of the films, if more than one are deposited, may be thin film(s).

Certain methods (e.g., methods including exclusively 3D-printing steps, methods including exclusively non-3D printing steps, methods including both 3D-printing steps and non-3D-printing steps) comprise depositing a material that does not form a film on a substrate. For instance, a material may be deposited onto a substrate into which it infiltrates. As an example, a material may be deposited onto a porous substrate (e.g., a porous textile) and then infiltrate into at least a portion of the pores of the porous substrate. After it has been deposited onto the porous substrate, it may fill a portion of the pores of the porous substrate. The material may enhance the mechanical properties of the substrate. In some embodiments, a material deposited onto a substrate into which it infiltrates, such as a porous substrate, does not extend an appreciable distance (or at all) beyond the surface of the porous substrate.

In one set of embodiments, one or more methods for manufacturing 3D-printed articles as described herein may be advantageous in comparison to other methods for making articles for use in footwear. For example, a footwear manufacturer employing a method as described herein may be able to use fewer processes to create the article than would be employed in other comparable processes (e.g., the manufacturer may use a three-dimensional printer (3D printer) in a single process to make a component that would otherwise be made by a combination of several processes such as injection molding, lamination, and the like). This may allow for more rapid and/or more facile manufacturing. As another example, one or more of the methods described herein may not necessarily require the use equipment that is expensive to manufacture and whose cost is typically recovered only after repeated use (e.g., molds). Some of the methods described herein may instead employ a 3D printer to create articles whose design can be modified as desired with little or no added cost. In some embodiments, it may be economical for methods as described herein to create small batches of 3D-printed articles (e.g., batches of less than 100, less than 50, or less than 10). It is thus possible for manufacturers to employ some of the methods described herein to respond to changing market conditions, to create articles for use in footwear that are designed for individual users or groups of users, etc. In some embodiments, it may be advantageous to use one or more of the methods described herein to fabricate a 3D-printed article at the point of sale and/or to avoid long distance shipping.

As explained above, certain methods of manufacturing an article as described herein may include both 3D-printing steps and non-3D-printing steps. For example, additive manufacturing (e.g., 3D-printing) may be utilized to manufacture one or more components that may be subsequently used in one or more 3D-printing steps and/or non-3D-printing steps to produce an article for use in footwear or other applications. Certain embodiments described herein relate to a digital molding process. In some embodiments, for example, an additive manufacturing process may be used to manufacture a first mold (e.g., a master mold). The first mold may be used, in some embodiments, to provide a second mold (e.g., a secondary mold) by, for example, casting an elastomer into the first mold. According to certain embodiments, the second mold may then be digitally filled by dispensing a curable liquid into the second mold and at least partially curing the curable liquid in the second mold. The at least partially cured liquid may be transferred, in some embodiments, from the second mold to a receiving substrate (e.g., a textile) as the at least partially cured liquid becomes fully cured, thereby providing an article (e.g., footwear).

The digital molding process may advantageously be used to manufacture designs (e.g., computer-aided designs) with finer features and increased production speed while requiring less material as compared to conventional manufacturing processes and/or 3D-printing processes, therefore significantly reducing manufacturing and labor costs. In some embodiments, for example, automated digital filling of the 3D-fabricated mold (e.g., master mold), as explained above, may be used to provide an article comprising a number of high-resolution features that may have desirable properties. In some embodiments, for example, the features have zonally variable material properties, such as variable optical properties (e.g., multi-colored) and/or variable mechanical properties (e.g., stiffness).

As used herein, the term "master mold" generally refers to a mold that has at least some sections that substantially resemble the configuration (e.g., shape and/or size) of a part that will be produced from a secondary mold that is created from the master mold. The master mold may have a neutral surface that contacts the transfer medium. The master mold may be a positive master mold or a negative master mold. In the case of a positive master mold, for example, the neutral surface is the lowest upward facing surface. Alternatively, in the case of a negative master mold, the neutral surface is the highest upward facing surface. In certain non-limiting embodiments, for example, a first mold (e.g., a positive master mold) may be manufactured by additive manufacturing. The positive master mold may, in some embodiments, be used to provide a second mold (e.g., a negative secondary mold) by, for example, casting an elastomer into the positive master mold. In some such embodiments, the features that protrude above the neutral surface in the positive master mold form cavities in the negative secondary mold via casting the elastomer, as explained herein in further detail.

The term "curable liquid" as used herein is given its ordinary meaning in the art and generally refers to a flowable liquid that can undergo a change in one or more properties to become a solid material. In some embodiments, for example, in the case of a curable liquid comprising a thermoset material, the change may occur through one or more chemical reactions (e.g., crosslinking). In other embodiments, for example, in the case of a curable liquid comprising a dispersion, polymer solution, and/or an emulsion, the change may occur through evaporation of water or a solvent.

A non-limiting example of a 3D-printed article for use in footwear is shown in FIG. 1A. In this figure, 3D-printed article 100 comprises first portion 110 and second portion 120. As used herein, a portion of an article may refer to any collection of points within the article (i.e., points that are within the portion of space bounded by the external surfaces of the article). Portions of the article are typically, but not always, volumes of space within the article (in some embodiments, a portion may be a surface within an article, a line within an article, or a point within an article). Portions of the article may be continuous (i.e., each point within the portion may be connected by a pathway that does not pass through any points external to the portion) or may be discontinuous (i.e., the portion may comprise at least one point that cannot be connected to at least one other point within the article by a pathway that does not pass through any points external to the portion). Portions of an article may be substantially homogeneous with respect to one or more properties (e.g., one or more properties of the portion may vary with a standard deviation of less than or equal to 1%, 2%, 5%, or 10% throughout the portion), and/or may be heterogeneous with respect to one or more properties (e.g., one or more properties of the portion may vary with a standard deviation of greater than or equal to 1%, 2%, 5%, or 10% throughout the portion).

Portions of an article may have any suitable size. In some embodiments, a portion may have a largest dimension and/or may comprise one or more features with a size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, a portion may have a largest dimension and/or may comprise one or more features with a size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

In some embodiments, a 3D-printed article may comprise two or more portions, where one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) of a first portion may differ from one or more properties of a second portion. The one or more properties may be structural properties (e.g., average pore size, density, surface roughness, filler content), chemical properties (e.g., average degree of cross-linking, chemical composition), mechanical properties (e.g., average stiffness, stiffness of solid components, Shore A hardness, abrasion resistance, stiffness anisotropy, elastic modulus, flexural modulus, strength, elongation at break, tensile elastic modulus, modulus at 100% strain), optical properties (e.g., color, opacity, reflectivity), and/or other properties (e.g., average thermal conductivity, electrical conductivity, conductivity, breathability, dimensional change upon heat activation). In some embodiments, the difference in properties between the first portion and the second portion may comprise a gradient of the one or more properties (e.g., the property or properties may vary relatively smoothly from a first value in the first portion to a second value in the second portion). In other embodiments, there may be a sharp change in one or more of the properties at a boundary of one or more of the first portion and the second portion.

It should be understood that while FIG. 1A shows the second portion positioned above the first portion, other arrangements of the first portion with respect to the second portion are also contemplated. For example, the first portion may be positioned beside the second portion, the first portion may surround the second portion, the first portion and the second portion may interpenetrate (e.g., a first portion may comprise a foam that interpenetrates with a second portion that comprises an elastomer), etc. It should also be noted that while FIG. 1A shows the second portion directly adjacent the first portion, this configuration should not be understood to be limiting. In some embodiments, the first portion may be separated from the second portion by one or more intervening portions positioned between the first portion and the second portion. As used herein, a portion that is positioned "between" two portions may be directly between the two portions such that no intervening portion is present, or an intervening portion may be present.

Similarly, while FIG. 1A only depicts two portions, it should also be understood that an article may comprise three portions, four portions, or more portions. In some embodiments, portions within a 3D-printed article as described herein may also further comprise sub-portions. Each portion and/or sub-portion may differ from each other (sub-)portion in at least one way (e.g., any two (sub-)portions may comprise at least one property that is different), or one or more (sub-)portions may be substantially similar to other (sub-)portion(s) of the 3D-printed article.

In some embodiments, two or more portions may be disposed relative to each other such that they may be connected by a pathway along which the 3D-printed article lacks an interface along which one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes. In other words, the property or properties may vary smoothly along the pathway. The pathway may be a straight path pathway (e.g., it may be a line segment), or it may include one or more curves or corners (e.g., it may be a meander, as described more fully below). In some embodiments, the pathway may be a pathway along which material was deposited during formation of the 3D-printed article, such as a pathway travelled by a print head (or by a substrate with respect to the print head) during 3D-printing.

When two or more portions are connected by a pathway, the pathway may have any suitable length. In some embodiments, the pathway has a length of greater than or equal to 0.5 mm, greater than or equal to 1 mm, greater than or equal to 2 mm, greater than or equal to 5 mm, greater than or equal to 10 mm, greater than or equal to 20 mm, greater than or equal to 50 mm, greater than or equal to 100 mm, greater than or equal to 200 mm, greater than or equal to 500 mm, greater than or equal to 1 m, greater than or equal to 2 m, or greater than or equal to 5 m. In some embodiments, the pathway has a length of less than or equal to 10 m, less than or equal to 5 m, less than or equal to 2 m, less than or equal to 1 m, less than or equal to 500 mm, less than or equal to 200 mm, less than or equal to 100 mm, less than or equal to 50 mm, less than or equal to 20 mm, less than or equal to 10 mm, less than or equal to 5 mm, less than or equal to 2 mm, or less than or equal to 1 mm. Combinations of the above-referenced ranges are also possible (e.g., greater than or equal to 0.5 mm and less than or equal to 10 m, or greater than or equal to 0.5 mm and less than or equal to 50 mm). In some embodiments, the length of the pathway may have a certain relationship to the 3D-printed article (e.g., if the 3D-printed article is an article of footwear, the length of the pathway may be the length of the article of footwear). Other ranges are also possible.

When a first portion and a second portion are connected by a pathway, a property (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) may change along the pathway at a rate that is advantageous. The average rate of change of the property may be greater than or equal to 0.05% of the average of the property in the first portion per mm, greater than or equal to 0.1% of the average of the property in the first portion per mm, greater than or equal to 0.2% of the average of the property in the first portion per mm, greater than or equal to 0.5% of the average of the property in the first portion per mm, greater than or equal to 1% of the average of the property in the first portion per mm, or greater than or equal to 2% of the average of the property in the first portion per mm. The average rate of change of the property may be less than or equal to 5% of the average of the property in the first portion per mm, less than or equal to 2% of the average of the property in the first portion per mm, less than or equal to 1% of the average of the property in the first portion per mm, less than or equal to 0.5% of the average of the property in the first portion per mm, less than or equal to 0.2% of the average of the property in the first portion per mm, or less than or equal to 0.1% of the average of the property in the first portion per mm. Combinations of the above-referenced ranges are also possible (e.g., greater than or equal to 0.05% and less than or equal to 5%). Other ranges are also possible. It should be understood that the average rates of changed described above may apply to pathways that straight (e.g., pathways that are line segments), or to pathways that are curved.

In some embodiments, a first portion and a second portion as described herein may be components of a 3D-printed article that is a single integrated material. As used herein, two or more portions that together form a single integrated material are not separated by a separable interface. In some embodiments, a single integrated material may not separate into discrete parts during the course of normal use, and/or may be separated into discrete parts whose morphologies would not be predictable prior to normal use and/or along interfaces that would not be predictable prior to normal use. For instance, a single integrated material may lack seams and/or lack an adhesive that bonds two or more portions together. In some cases, the 3D-printed article as a whole may lack an interface at which one or more properties (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability) undergo step changes as described above. In some cases, the property or properties may vary smoothly throughout the 3D-printed article.

In some embodiments, one or more portions may together form an 3D-printed article with one or more of the following features: macrovoids embedded within the article (e.g., a midsole) without an intersecting interface from overmolding, lamination, or ultrasonic welding; one or more open cell lattices; variations in density across geometries that would be challenging to form by molding; interpenetrating foams and elastomers that may, in some embodiments, not be separated by an interface due to molding or lamination; and/or one or more interfaces between different materials with extreme undercuts (e.g., materials with a negative draft angle, materials which cannot be injection molded using a single mold because they would be unable to slide out of the mold).

According to certain embodiments, an article may be manufactured by dispensing a curable liquid into a mold. The mold may be digitally filled with the curable liquid, according to some embodiments. In certain embodiments, for example, the curable liquid may be dispensed through a printing nozzle disposed on a robotic gantry as explained herein in greater detail. According to certain embodiments, the curable liquid may be dispensed into the mold by extrusion. In some embodiments, the curable liquid may be dispensed into the mold by additive manufacturing (e.g., 3D-printing). According to some embodiments, the curable liquid may be dispensed into the mold using one or more non-3D-printing steps. For example, in some embodiments, neither the printing nozzle nor the robotic gantry are part of or otherwise associated with an additive manufacturing device (e.g., a 3D-printer).

In some embodiments, a composition of the curable liquid may be varied between a first portion of the composition and a second portion of the composition, thereby providing a material (e.g., upon curing) comprising a variation in properties between a first portion of the material and a second portion of the material, similar to the concept described above of properties being varied in 3D-printed articles. For example, one or more properties of a first portion of the curable liquid may differ from one or more properties of a second portion of the curable liquid, resulting in a cured material with a variation in properties, including, but not limited to, pore size, density, stiffness, Shore A hardness, tensile elastic modulus, degree of cross-linking, chemical composition, color, and/or reflectivity, between a first portion of the cured material and a second portion of the cured material. The one or more properties of the cured material may be structural properties (e.g., pore size, density, etc.), chemical properties (e.g., degree of cross-linking, chemical composition, etc.), mechanical properties (e.g., stiffness, Shore A hardness, tensile elastic modulus, etc.), optical properties (e.g., color, reflectivity, etc.), and/or other properties.

As will be described in further detail below, the curable liquid may comprise a catalyst, in some embodiments. The presence of a catalyst in the curable liquid may advantageously affect the cure rate of the curable liquid, as would generally be understood by a person of ordinary skill in the art. According to some embodiments, a concentration of the catalyst in the curable liquid may be varied between a first portion of the composition and a second portion of the composition. In some such embodiments, the concentration of the catalyst may be varied by at least 10%, at least 20%, at least 30%, at least 40%, at least 50%, or more, between at least a first portion of the composition of the curable liquid and the second portion of the composition of the curable liquid.

In certain embodiments, the one or more properties of the first portion of the cured material that differ from the one or more properties of the second portion of the cured material may be a tensile elastic modulus. In certain embodiments, for example, the tensile elastic modulus of the cured material is varied by at least 10%, at least 20%, at least 30%, at least 40%, at least 50%, or more between at least a first portion of the cured material and the second portion of the cured material.

Figure 1B:
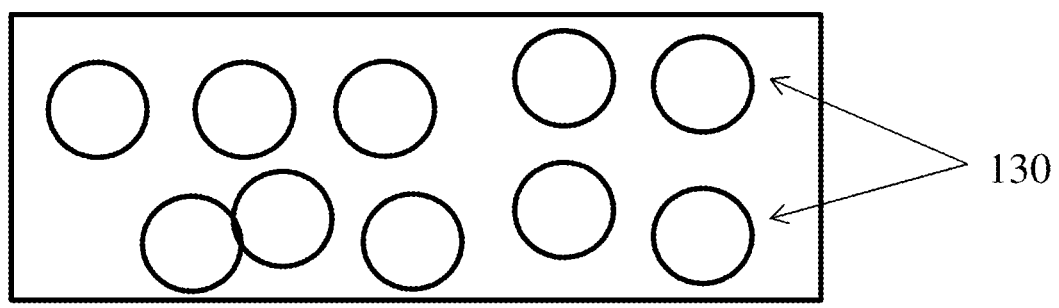

In some embodiments, a 3D-printed article (e.g., a 3D-printed article comprising two or more portions) may be a foam (e.g., a closed cell foam). For instance, FIG. 1B shows one non-limiting embodiment of a 3D-printed article 100 which is a foam comprising pores 130. The foam may be a material comprising a matrix and pores disposed within the matrix. Pores may be randomly distributed throughout the foam, or may be positioned at regular and/or predetermined intervals. The material present within the pores of a foam is typically of a different phase than the material forming the matrix of the foam (e.g., a foam may comprise pores that comprise gas within a matrix that comprises a liquid and/or a solid). As would be understood to one of ordinary skill in the art, in a closed-cell foam, the cells of the foam are typically isolated or separated from each other. By contrast, in an open-cell foam, the cells of the foam are interconnected with each other; for example, they may be formed in an interconnected fashion, or the cells may be ruptured or become interconnected during or after formation of the foam. These conditions are typically more violent foaming conditions than those resulting in a closed-cell foam. The foam may be formed from a variety of polymers and gases. The gases may be introduced into the foam during formation (e.g., physically), and/or generated during formation (e.g., via chemical reaction). In addition, in some cases, a gas may be introduced by providing a liquid that forms a gas, e.g., upon a decrease in pressure or an increase in temperature. For instance, a liquid such as butane may be kept under pressure and/or cooled prior to introduction into the nozzle or the mixing chamber; a change in temperature and/or pressure may cause the liquid to form a gas. Without wishing to be bound by theory, closed cell foams and open cell foams may have different properties (e.g., closed cell foams may have different values of density, stiffness, Shore A hardness, and the like than otherwise equivalent open cell foams) and may be suitable for different applications. In some embodiments, closed cell foams may have properties that are better suited to footwear applications than open cell foams. In some embodiments, a 3D-printed article or a portion thereof may comprise an enclosed open cell foam, or an open cell foam surrounded by a layer of continuous material. In some cases, an enclosed open cell foam may be suitable for use as an air cushion, and/or may have tactile properties that may be varied by varying infill density.

It should also be understood that certain 3D-printed articles described herein may not be foams (i.e., they may not include any pores). For instance, certain embodiments may relate to 3D-printed articles that are not foams and that comprise one or more elastomers. In addition, in some cases, an article may be printed that can then be formed into a foam, e.g., using a chemical reaction to produce a gas within the article.

Figure 1C:
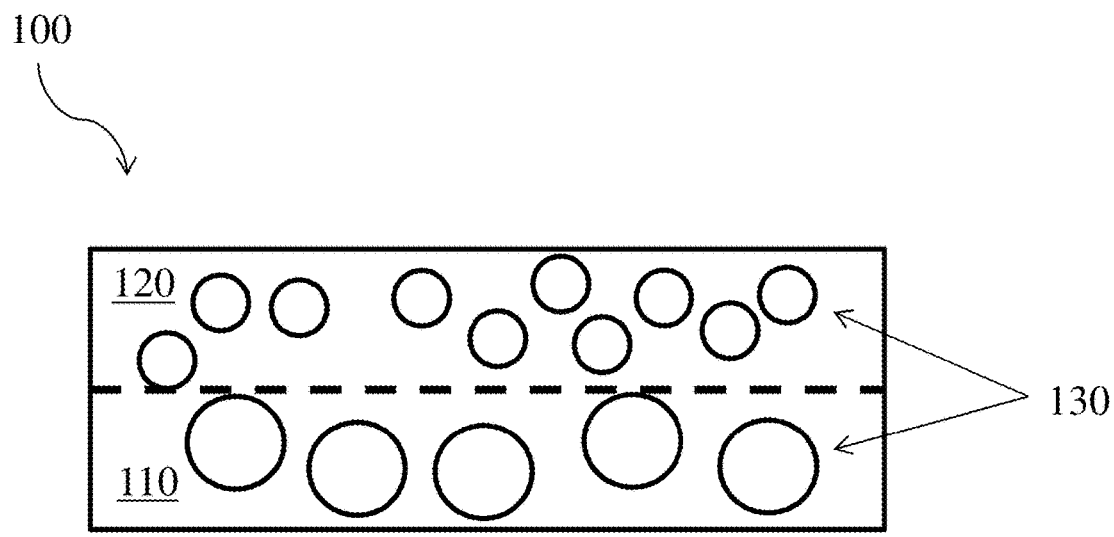

As shown in FIG. 1C, in some but not necessarily all embodiments, a 3D-printed article that is a foam (e.g., a closed-cell foam that is optionally a single integrated material) may comprise one or more portions having different properties. FIG. 1C shows 3D-printed article 100 comprising first portion 110, second portion 120, and pores 130. Although FIG. 1C depicts a 3D-printed article comprising an average pore (or cell) size in the first portion (i.e. a first average pore size) that is different from an average pore (or cell) size in the second portion (i.e., a second average pore size), in some embodiments the first portion and the second portion may have the same average pore size but may comprise differences in other properties (e.g., one or more of the density, stiffness, Shore A hardness, degree of cross-linking, chemical composition may be different in the first portion than in the second portion). Thus the pore sizes are presented here for illustrative portions only. Similarly, although FIG. 1C shows an average pore size in the first portion that is larger than the average pore size in the second portion, in some embodiments the average pore size of the first portion may be smaller than the average pore size of the second portion.

According to certain embodiments, the foam may have any of a variety of suitable properties, such as any of those described in U.S. application Ser. No. 17/188,490, entitled "System and method for maintaining a consistent temperature gradient across an electronic display," which is incorporated by reference herein in its entirety.

Figure 2:
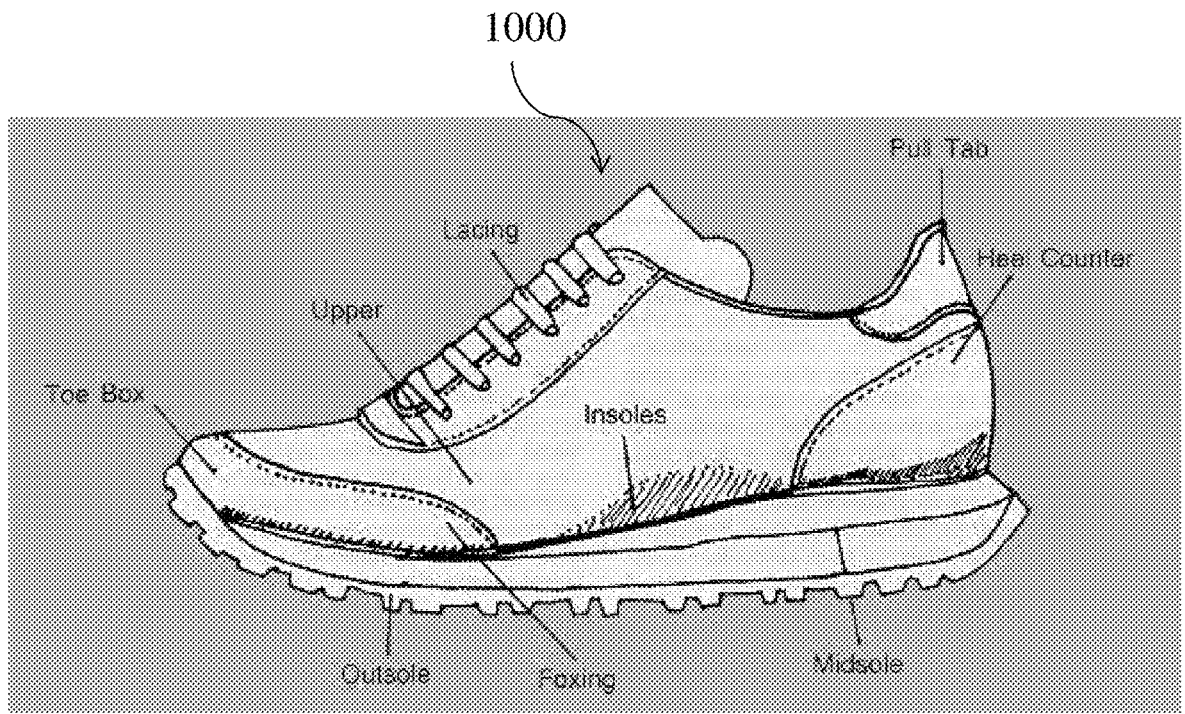
FIG. 2 illustrates an article of footwear according to certain embodiments of the invention.

In some embodiments, a 3D-printed article as described herein may be suitable for use as a component of one or more articles of footwear. In certain embodiments, a 3D-printed article as described herein may be suitable for use in manufacturing one or more articles of footwear. FIG. 2 shows one non-limiting embodiment of an article of footwear 1000. The article of footwear comprises a sole, a toe box, an upper, lacing, a heel counter, and a pull tab. It should be understood that 3D-printed articles suitable for use in footwear may form any of the components or be a portion of any or all of the components shown in FIG. 2. In some embodiments, multiple 3D-printed articles may be positioned on a single article of footwear (e.g., a single article of footwear may comprise a 3D-printed article that is disposed on a sole or is a sole and a 3D-printed article that is disposed on an upper). In some embodiments, the 3D-printed article may be a sole or a sole component, such as an outsole, a midsole, or an insole. In some embodiments, the 3D-printed article may be an article that is printed onto a sole component, such as a midsole and/or insole that is printed onto an outsole (e.g., a commercially available outsole, an outsole produced by a non-3D printing process). In some embodiments, the 3D-printed article may be an upper. In some embodiments, the 3D-printed article may be an article that is printed onto an upper, such as a toe box, a heel counter, an ankle support, an eyestay, an article comprising a logo and/or embodying a logo, an eyelet, a quarter panel, a no sew overlay feature, and/or a pull tab. The upper may be one component of a fully assembled shoe which lacks the part(s) to be printed, or it may be an upper that has not been assembled with other footwear components. In some embodiments, a 3D-printed article may be a combination of two or more footwear components that are typically provided as separate articles. For example, the 3D-printed article may be able to serve as both a midsole and an insole, or may comprise a midsole and an insole that are a single integrated material. As another example, the 3D-printed article may be able to serve as both an outsole and an insole, or may comprise an outsole and an insole that are a single integrated material. In some embodiments, a 3D-printed article comprising two or more footwear components (e.g., a 3D-printed article comprising a midsole and an insole, a 3D-printed article comprising an outsole and an insole) may be printed using a single integrated process. Although FIG. 2 shows an athletic shoe, 3D-printed articles suitable for use in other types of footwear are also contemplated as described in further detail below. In some embodiments, the 3D-printed article may also or instead be suitable for one or more non-footwear components, such as orthotics and/or prosthetics.

As described above, certain articles as described herein may be formed by a process involving one or more 3D-printing steps. In some embodiments, an article may be formed by a process involving both one or more 3D-printing steps and one or more non-3D-printing steps. For example, an article may be formed by a first 3D-printing step followed by a first non-3D-printing step which is optionally followed by one or more further 3D-printing steps or non-3D-printing steps. For example, a sole or sole component may be 3D-printed into a mold to form a first portion and then a material may be injection molded or compression molded above the first portion to form the second portion. Third, fourth, fifth, and/or higher numbered portions may then optionally be formed on the second portion (by, e.g., 3D-printing). As another example, a non-3D printing step may comprise directly bonding two materials by pressing a first material (e.g., a non-3D-printed material, an upper) into a second 3D-printed material (e.g., a 3D-printed midsole) prior to full curing of the second material. As a third example, an inkjet finishing process may be applied to deposit one or more materials (e.g., one more pigments) on a 3D-printed article or on a material disposed on a 3D-printed article (e.g., a material injection molded or compression molded on a 3D-printed article). In some embodiments, an inkjet finishing process may enhance the surface quality of the article that is subject to it.

A variety of suitable inkjet processes may be combined with 3D-printing processes described herein. In some embodiments, an inkjet process may be employed to deposit one or more layers of material onto a 3D-printed article. For instance, two or more layers may be deposited consecutively to increase the thickness of a surface finishing layer and/or to form a 3D structure on the surface of the 3D-printed article. The layer(s), or other structure(s) formed by an inkjet process, may comprise one or more translucent portions (e.g., may be translucent) and/or may comprise one or more non-translucent portions (e.g., may be non-translucent). The layer(s) or other structure(s) may cover one or more portions of the 3D-printed article (e.g., may cover one or more portions of the 3D-printed article and not cover one or more portions of the 3D-printed article) or may cover the entirety of the 3D-printed article. The layer(s) or structure(s) may have a variety of surface properties. In certain embodiments, the layer(s) or other structure(s) may increase the surface roughness of the article, cause the article to have a matte finish, and/or reduce the reflectivity of the article (e.g., reduce the reflectivity of its surface).

Figure 4A:
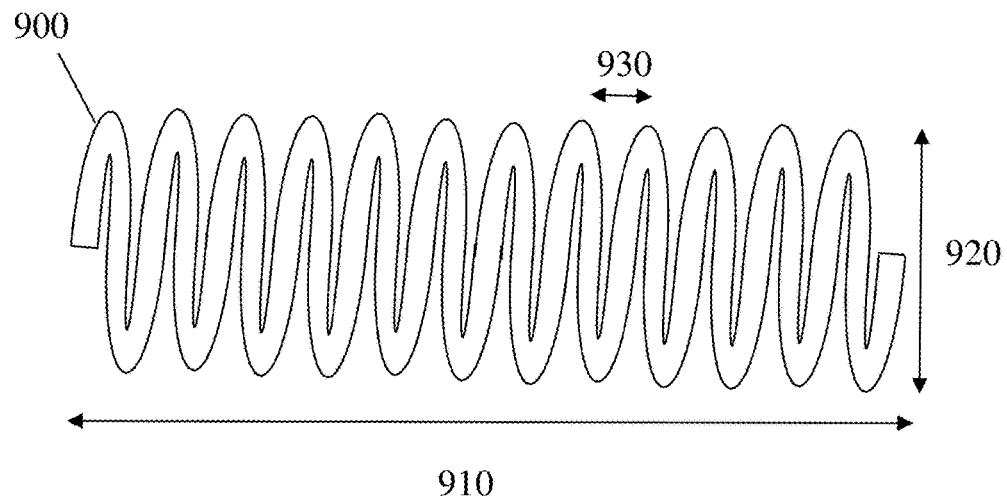
FIGS. 4A and 4B are schematic illustrations of meanders, according to some embodiments of the invention.
Figure 4B:
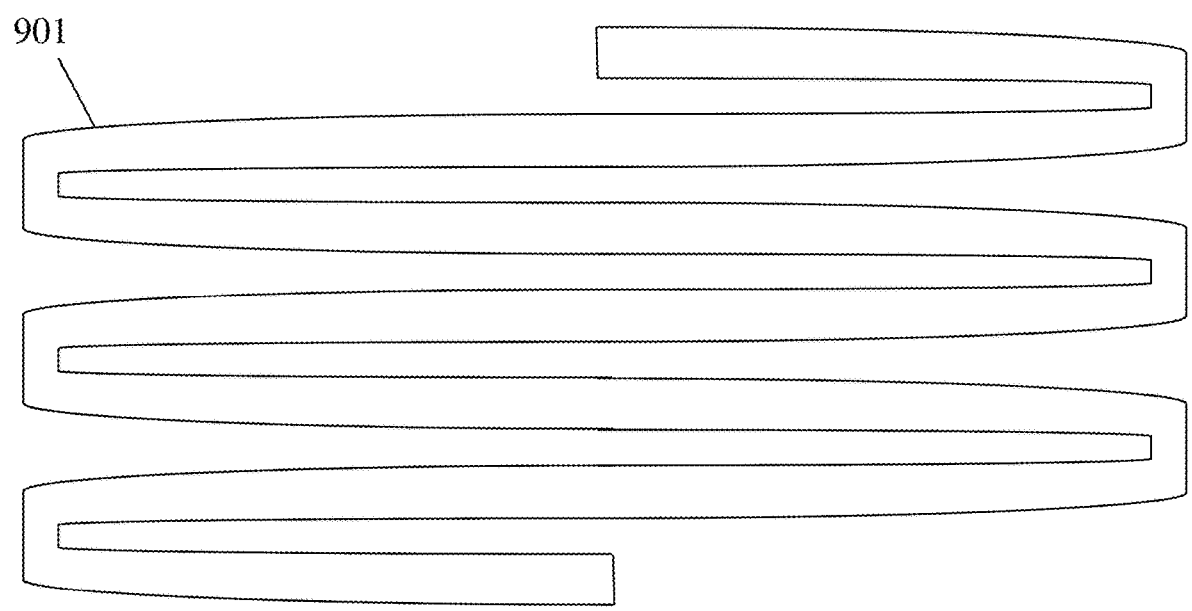

As will be described in further detail below, 3D-printed articles may be formed by depositing a material from a nozzle onto a substrate. The nozzle may be translated with respect to the substrate (and/or the substrate translated with respect to the nozzle) during this process. In certain cases, the nozzle and/or substrate may be translated such that the deposited material meanders (i.e., forms a meander on the substrate). Meanders typically have a length, width, and repeat period. FIG. 4A shows one non-limiting example of a meander 900, with length 910, width 920, and repeat period 930. The meander may have other relative proportions of length, width, and repeat period. For example, FIG. 4B shows a meander 901 with a relatively larger width and smaller length than meander 900. It should be noted that meanders may have different shapes than those shown in FIGS. 4A and 4B (e.g., they may have repeat periods along two or more distinct axes). In some cases material may be deposited in meanders that do not have a repeat period, or have a repeat period including some irregularities. For example, the meander may be a meander where the width and/or repeat period changes (e.g., with position, such as along the length of the meander), the meander may be an irregular curve, etc. If the width and/or repeat period of the meander changes, it may do so monotonically or may increase in some portions of the meander and decrease in other portions of the meander.

Figure 5A:
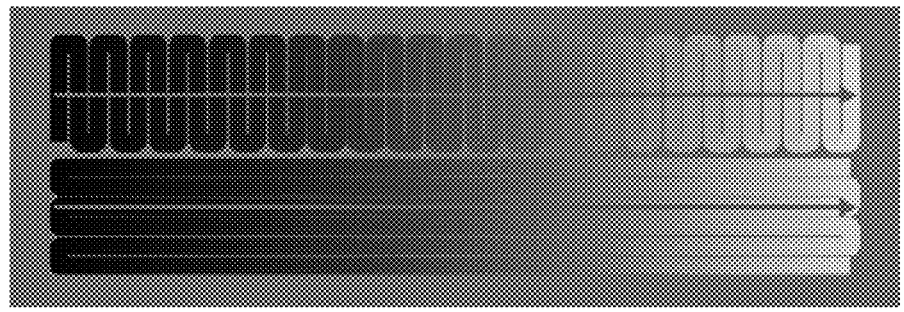
FIG. 5A is a schematic illustration of meanders parallel and perpendicular to gradients, according to some embodiments of the invention.
Figure 5B:
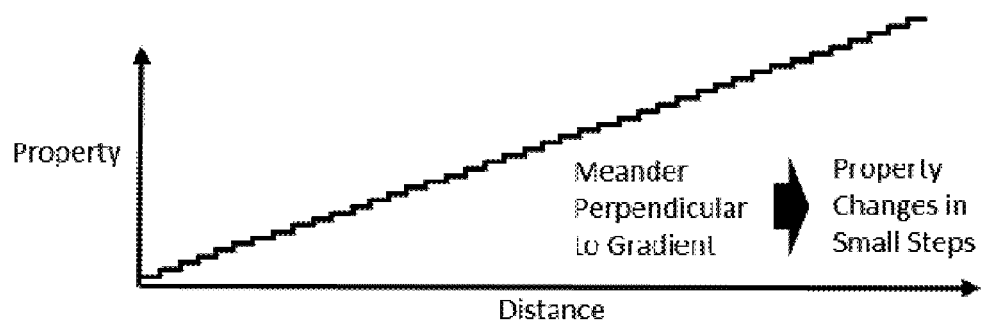
FIG. 5B is a plot showing a stepped gradient, according to some embodiments of the invention.
Figure 5C:
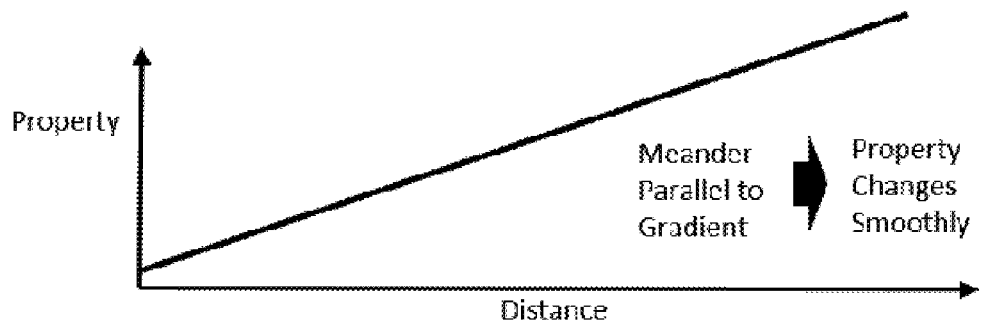
FIG. 5C is a plot showing a smooth gradient, according to some embodiments of the invention.

In some cases, one or more properties of the material being deposited by the nozzle may change as a function of time and/or position, which may result in changes in one or more properties of the 3D-printed article as a function of printing time and/or position. As one example, a gradient in a property (e.g., average pore size, density, stiffness, stiffness of solid components of the article, Shore A hardness, degree of cross-linking, chemical composition, color, abrasion resistance, thermal conductivity, electrical conductivity, stiffness anisotropy, elastic modulus, flexural modulus, filler content, opacity, conductivity, breathability, etc.) may be generated by varying one or more properties of the material being deposited by the nozzle. In some cases, a material may be deposited on a substrate in a meander (which may be regular or irregular) and a gradient may be formed along the meander or perpendicular to the meander. FIG. 5A shows a non-limiting schematic depiction of a gradient that is parallel to a meander and a non-limiting schematic depiction of a gradient that is perpendicular to a meander. FIG. 5B shows a non-limiting example of the change in the value of a property as a function of distance along the gradient when the gradient is formed perpendicular to the meander. Gradients of this type are stepped gradients, or gradients encompassing step changes. FIG. 5C shows a non-limiting example of the change in the value of a property as a function of distance along the gradient when the gradient is formed parallel to the meander. Gradients of this type are smooth gradients, or gradients that lack step changes. The rate of change of the gradient, in a smooth gradient, may be constant (i.e., a linear gradient), or the rate of change may result in a non-linear smooth gradient. It should be understood that both smooth and stepped gradients are encompassed by the use of the term gradient, and that gradients referenced herein, if not otherwise specified, should be understood to include smooth gradients in some embodiments and stepped gradients in other embodiments. In addition, some gradients may comprise one or more smooth portions and one or more stepped portions.

In certain embodiments, an article (e.g., a portion, an article of footwear, a component of an article of footwear) as described herein may be produced on a multi-axis deposition system, and/or a method as described herein may include at least one step (e.g., a 3D-printing step, a non-3D-printing step) that is performed on a multi-axis deposition system. It should be understood that articles of apparel (e.g., an article of apparel such as a sports bra, a component of an article of apparel such as a sports bra) may also be produced on a multi-axis deposition system as described herein. In general, and as described further below, multi-axis deposition systems include a print head and a substrate. The print head may be any suitable print head configured to deposit a material onto the substrate. The substrate may be any suitable substrate onto which a material may be deposited; in some embodiments, one or more articles (e.g., a component of an article of footwear, an upper, a sock liner) may be disposed on the substrate. In certain embodiments, one or both of the print head and substrate may be translated along one or more axes and/or rotated around one or more axes. Translation and/or rotation of the print head and/or substrate may enable the position of the print head with respect to the substrate to be changed prior to, during, and/or after a printing process. In some cases, translation and/or rotation of the print head and/or the substrate may allow the print head to deposit material onto a wide variety of substrate surfaces and/or allow the print head to deposit material onto the substrate at a wide variety of angles. In some embodiments, the print head may be configured to be rotated and/or translated such that it can deposit material onto each surface of the substrate.

Figure 6:
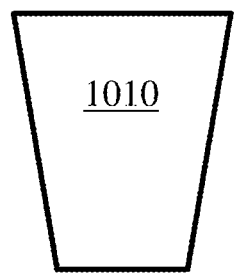
FIG. 6 is a schematic depiction of a print head and a substrate, according to certain embodiments of the invention.
Figure 6:
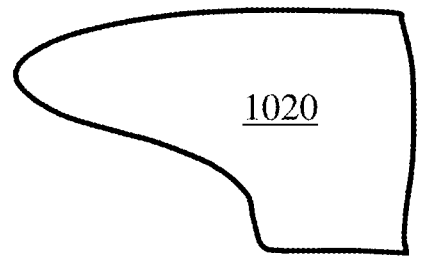

FIG. 6 shows one non-limiting embodiment of a multi-axis deposition system comprising print head 1010 and substrate 1020. The print head, substrate, and multi-axis deposition system will be described in further detail below.

A print head in a multi-axis deposition system may be any suitable print head configured to deposit a material of interest onto the substrate. In some embodiments a multi-axis deposition system may comprise two or more print heads. Non-limiting examples of suitable print heads include a direct write head, a mixing nozzle as described further below, an ink jet head, a spray valve, an aerosol jet print head, a laser cutting head, a hot air gun, a hot knife, an ultrasonic knife, a sanding head, a polishing head, a UV curing device, an engraver, an embosser, and the like. In some embodiments, it may be advantageous for the multi-axis deposition system to comprise a first print head that comprises a mixing nozzle and a second print head that does not comprise a mixing nozzle. As also described below, in some embodiments, the print head may be configured to accept one or more material inputs (e.g., one material input, two material inputs, etc.). When two or more material inputs are present, the inputs may be substantially the same or they may differ. In some embodiments, the print head may be configured to mix two or more reactive material inputs to form a reactive mixture that may be deposited onto a substrate while the first and second material inputs are reacting and/or after the first and second material inputs have reacted. For example, the print head may be configured to mix a polyol and an isocyanate to form a reactive polyurethane mixture. Other examples of suitable reactive mixtures include reactive polyurea mixtures, reactive mixtures comprising reactive polyurethane and reactive polyurea blends (e.g., polyurethane/polyurea hybrid formulations), reactive mixtures comprising epoxy groups and amine groups, and reactive silicone mixtures.

A substrate in a multi-axis deposition system may be any suitable substrate capable of receiving the material deposited by the print head. In some cases, the substrate may have a shape that enables facile deposition of the material of interest in a morphology of interest by the print head. As an example, the substrate may have a shape that substantially corresponds to the morphology of interest, such as a footwear last for footwear applications (e.g., as shown in FIG. 6). In other embodiments, the substrate may have a shape that substantially corresponds to a morphology of interest for an article of apparel (e.g., a bra cup for sports bra applications and/or for bra lining applications, an article substantially corresponding to the shape of a knee for knee brace applications, an article substantially corresponding to the shape of an ankle for ankle brace applications, an article substantially corresponding to the shape of a wrist for wrist brace applications, an article substantially corresponding to the shape of a shoulder for shoulder brace applications, and/or an article substantially corresponding to the shape of an arm for arm band applications). As another example, the substrate may be a mold or a portion of a mold. In some embodiments, the mold may be a positive master mold or a negative master mold, as explained herein in greater detail. As a third example, the substrate may comprise a portion that is curved, and/or the substrate as a whole may be curved. For instance, the substrate may have a spherical shape, or a hemispherical shape. As a fourth example, the substrate may comprise two or more surfaces that are joined at facets. In some such cases, the substrate may be a platonic solid or may comprise a portion that is a platonic solid. In some embodiments, the substrate may be substantially flat. Other types of substrates are also possible.

In some embodiments, a multi-axis deposition system may comprise a substrate that is removable. The substrate may be configured to be positioned in the multi-axis deposition system during material deposition and removed after material deposition. In some embodiments, a multi-axis deposition system may comprise multiple substrates that may be added to the multi-axis deposition system prior to material deposition and/or removed from the multi-axis deposition system after material deposition. Each substrate may have a different shape (e.g., a different shoe size, a different cup size, a mold for a different type of apparel), or two or more substrates may have substantially the same shape.

As described above, one or more articles may be disposed on the substrate prior to material deposition and/or during material deposition using the multi-axis deposition system. The article(s) disposed on the substrate may be configured to be positioned on the substrate during material deposition and, optionally, removed from the substrate after material deposition. In some embodiments, a multi-axis deposition system may be configured to deposit material onto a multiple articles successively, each of which may be added to the multi-axis deposition system prior to material deposition and/or removed from the multi-axis deposition system after material deposition. For example, a textile (e.g., a non-flat textile, an upper, a woven textile, a knit textile) may be disposed on the substrate prior to material deposition, during material deposition, and/or after material deposition. In some embodiments, a multi-axis deposition system may be employed to deposit a reactive mixture as described above onto a textile to form a 3D-printed material on the textile and/or on a succession of textiles sequentially added to the substrate.

It should be noted that the print head(s) and the substrate in a multi-axis deposition system comprising both a print head and a substrate may be oriented with respect to each other in other ways than that shown in FIG. 6. As an example, the print head may be disposed over the center of the substrate in some embodiments and over the edge of the substrate in other embodiments. As another example, the print head may be oriented so that it deposits material on the substrate at a 90° angle to the substrate in some embodiments and so that it deposits material on the substrate at another angle to the substrate (e.g., 45°, 30°, or other angles) in other embodiments. As a third example, the substrate may present a bottom surface (e.g., a portion of a last on which a sole would be disposed) to the print head in some embodiments and may present a side or top surface (e.g., a portion of a last on which an upper would be disposed) in other embodiments. In some cases, the print head(s) and/or the substrate may be configured to be translated and/or rotated around one or more axes, as described further below. In such cases, the absolute positions of the print head(s) and the substrate may be varied during operation of the multi-axis system, and/or the relative position of the print head(s) with respect to the substrate may be varied during operation of the multi-axis system.

As described above, a multi-axis deposition system may comprise a print head that may be configured to be translated along one or more axes. In some embodiments, the print head may be configured to be translated along one axis, along two axes, or along three axes. In certain cases, the axes may be perpendicular to each other. In other cases, two or more of the axes are not perpendicular to each other (e.g., they may intersect at an angle between 45° and) 90°. For example, in some embodiments the print head may be configured to be translated vertically, and/or translated in one or more directions perpendicular to the vertical direction. As another example, in some embodiments the print head may be configured to be translated in a direction perpendicular to the substrate, and/or in one or more directions parallel to the substrate. As a third example, in some embodiments the print head may be configured to be translated at a 45° angle with respect to the substrate. In some cases, each axis of translation may independently be controlled by separate motors. In some embodiments, the print head may not be configured to be translated.

In some embodiments, one or more print heads in a multi-axis system may be configured to be rotated around one axis, around two axes, or around three axes. In some embodiments, one or more print heads may be configured to be rotated around more than three axes (e.g., around more than four axes, around more than six axes, around more than eight axes, around more than 10 axes, or around more than 12 axes). In certain cases, the axes may be perpendicular to each other. For example, in some embodiments the print head may be configured to be rotated around a vertical axis, and/or rotated around one or more axes perpendicular to the vertical axis. As another example, in some embodiments one or more print heads may be configured to be rotated around an axis perpendicular to the substrate, and/or around one or more axes parallel to the substrate. In some cases, each axis of rotation may independently be controlled by separate motors. In some embodiments, one or more print heads may not be configured to be rotated. In some embodiments, the print head may be configured to be stationary.

In some embodiments, a substrate in a multi-axis system may be configured to be translated along one axis, along two axes, or along three axes. In certain cases, the axes may be perpendicular to each other. In other cases, two or more of the axes are perpendicular to each other (e.g., they may intersect at an angle between 45° and 90°). For example, in some embodiments the substrate may be configured to be translated vertically, and/or translated in one or more directions perpendicular to the vertical direction. As another example, in some embodiments the substrate may be configured to be translated in a direction perpendicular to the print head, and/or in one or more directions parallel to the print head. As a third example, in some embodiments the print head may be configured to be translated at a 45° angle with respect to the substrate. In some cases, each axis of translation may independently be controlled by separate motors. In some embodiments, the substrate may not be configured to be translated.

In some embodiments, a substrate in a multi-axis system may be configured to be rotated around one axis, around two axes, or around three axes. In certain cases, the axes may be perpendicular to each other. In some embodiments, the substrate may be configured to be rotated around more than three axes (e.g., around more than four axes, around more than six axes, around more than eight axes, around more than 10 axes, or around more than 12 axes). For example, in some embodiments the substrate may be configured to be rotated around a vertical axis, and/or rotated around one or more axes perpendicular to the vertical axis. As another example, in some embodiments the substrate may be configured to be rotated around an axis perpendicular to the print head, and/or around one or more axes parallel to the print head. In some cases, each axis of rotation may independently be controlled by separate motors. In some embodiments, the substrate may not be configured to be rotated. In some embodiments, the substrate may be configured to be stationary.

In some embodiments, a multi-axis deposition system may comprise one or more features that aid rotation and/or translation of a print head and/or a substrate. As an example, in some cases the print head may be attached to a print head arm that facilitates motion. When two or more print heads are present, each print head may be positioned separate print head arms or two or more print heads may be positioned on the same print head arm. In some cases, two or more print head arms may be attached to a single gantry. The print head arm(s) may be capable of facilitating translation and/or rotation of the print head(s). In some embodiments, the print head(s) may be attached to single print head arms; in other embodiments, the print head(s) may be attached to multiple print head arms that are attached at joints that allow for rotation and/or translation. In some cases, one or more motors may facilitate motion of one or more components of the print head arm(s). As another example, in some cases the substrate may be attached to a substrate arm that facilitates motion. The substrate arm may be capable of facilitating translation and/or rotation of the substrate. In some embodiments, the support substrate may be attached to a single substrate arm; in other embodiments, the substrate may be attached to multiple substrate arms that are attached at joints that allow for rotation and/or translation. In some cases, the substrate may be attached to a robot arm. In some cases, one or more motors may facilitate motion of one or more components of the substrate arm(s). In certain embodiments, the print head may be attached to a print head arm and the substrate may be attached to a substrate arm.

In some embodiments, a multi-axis system may have one or more features that make it suitable for 3D-printing materials of interest. For example, the multi-axis system may be configured to deposit a material onto a substrate as a continuous stream or as a continuous filament. In other words, the substrate may be in fluid communication with the print head via the material during deposition. In certain cases, the multi-axis system may be employed to deposit a continuous stream or filament that extends from a first side of a last or a material disposed on the last (e.g., an upper, a 3D-printed material disposed on an upper) across the bottom of the last or material disposed on the last to the opposing side of the last or material disposed on the last. In some cases, the multi-axis system may be employed to print each portion of an article of footwear except for the upper.

In some embodiments, a multi-axis system may be configured to 3D-print materials with one or more advantageous properties. For example, the multi-axis system may be configured to 3D-print materials with a feature size of greater than or equal to 100 microns, greater than or equal to 200 microns, greater than or equal to 500 microns, greater than or equal to 1 mm, greater than or equal to 2 mm, greater than or equal to 5 mm, greater than or equal to 10 mm, greater than or equal to 20 mm, greater than or equal to 50 mm, greater than or equal to 1 cm, or greater than or equal to 2 cm. In some embodiments, the multi-axis system may be configured to 3D-print materials with a feature size of less than or equal to 5 cm, less than or equal to 2 cm, less than or equal to 1 cm, less than or equal to 5 mm, less than or equal to 2 mm, less than or equal to 1 mm, less than or equal to 500 microns, or less than or equal to 200 microns. Combinations of the above-referenced ranges are also possible (e.g., greater than or equal to 100 microns and less than or equal to 5 cm). Other ranges are also possible.

Further details regarding the multi-axis deposition system are described in U.S. application Ser. No. 17/188,490, entitled "System and method for maintaining a consistent temperature gradient across an electronic display," which is incorporated by reference herein in its entirety.

In some embodiments, a 3D-printed material may be formed on an article disposed on a substrate that is configured to interact with a detection system in a manner that promotes alignment of the 3D-printed article (and/or portions thereof) with respect to the article disposed on the substrate and/or precision in the positioning of the 3D-printed article (and/or portions thereof) onto the article disposed on the substrate. For example, the article may comprise one or more features that may be detected by a detector. The detector may be in electronic communication (e.g., by use of a wired and/or wireless connection) with a print head configured to deposit a material onto the substrate and article disposed thereon, and/or may be configured to transmit information to the print head configured to deposit a material onto the substrate and article disposed thereon. In certain cases, the detector may be configured to detect information about the article disposed on the substrate, such as the location of the article (and/or a portion thereof) in space, with respect to the substrate, and/or with respect to the print head; the orientation of the article (and/or a portion thereof) in space, with respect to the substrate, and/or with respect to the print head; and/or one or more qualities associated with the article (e.g., the scale of the article, the skew of the article, the mirroring of the article, whether or not the article has undergone an affine transformation). The detector may send instructions to the print head and/or the substrate based on some or all of the information it detects. For example, the detector may detect that the article is located in an undesirable position, and may send an instruction to the substrate to translate and/or rotate so that the article is located in a desirable position. As a second example, the detector may detect that the article is located in a desirable position, and may send instructions to the print head to print onto the article and/or to translate and/or rotate to a desired position and then print onto the article. As a third example, the detector may detect that the article has undergone a certain amount of skew, and send instructions to the print head to modify its motion with respect to the article to account for the skew. Other types of instructions may also be sent.

When present, a detector configured to detect one of more features of an article disposed on a substrate may be located in any suitable position. The detector may be configured to be stationary (e.g., it may be mounted above the substrate at a fixed position), or may be configured to be translated and/or rotated (e.g., it may be mounted on a gantry on which one or more other features such as the print head may also be positioned). The detector may be configured to have a known position with respect to one or more other components of a deposition system (e.g., a print head, a substrate), and/or may be configured to detect its location with respect to one or more components of the deposition system (e.g., the print head, the substrate). For example, the detector may detect its position with respect to the print head by depositing a material onto the substrate (or an article disposed thereon) and detecting the location of the deposited material. In some embodiments, a detector configured to detect a feature is an optical detector and an article disposed on a substrate comprises features that may be detected optically. For example, the features may be patterns printed onto an article disposed on the substrate, portions of an article disposed on a substrate that scatter light in a detectable manner, portions of an article disposed on a substrate that absorb light in a detectable manner, and/or portions of an article disposed on a substrate that reflect light in a detectable manner. Other types of features that may be detected optically are also contemplated. One example of a suitable type of optical detector is an optical camera.

In some embodiments, as also described elsewhere herein, an article disposed on a substrate may be a fabric, such as a knitted fabric or a woven fabric. The fabrics may comprise one or more features which include one or more portions that are knitted or woven to form a pattern that may be detectable optically. The feature(s) may either be created inline (e.g., during the knitting or weaving process used to form the fabric), or may be added to the fabric after it has been formed. In some embodiments, the feature(s) may comprise portion(s) of a pattern (e.g., a repeating motif) knitted or woven into the fabric or printed onto the fabric.

According to certain embodiments involving one or more non-3D-printing steps, the detection system may be configured to promote the positioning of a curable liquid with respect to a mold (e.g., a negative secondary mold) that is configured to receive the curable liquid. The detection system may be in electronic communication (e.g., by use of a wired and/or wireless connection) with one or more printing nozzles that are configured to dispense the curable liquid into the mold. In some such embodiments, the detection system may be configured to detect one or more locations of the mold (and/or a portion thereof) with respect to the printing nozzle, the orientation of the mold (and/or a portion thereof) in space with respect to the printing nozzle, and/or the shape of the mold. The detector may send instructions to the printing nozzle based on some or all of the information it detects. For example, the detector may detect that the mold is in a desirable position, and may send instructions to the printing nozzle to dispense the curable liquid into the mold. In certain embodiments, the detection system that is configured to promote the positioning of the curable liquid with respect to the mold (e.g., a negative secondary mold) comprises laser sensors, structured light sensors, and/or camera sensors.

As discussed herein, a 3D printer may be provided that is capable of printing 3D articles with non-uniform material compositions, such as a shoe sole and/or a shoe upper. Such 3D articles may comprise a gradient structure with at least one non-uniform property (e.g., color, average stiffness, average Shore A hardness, average pore size, average density, surface roughness, reflectivity, strength, elongation at break, tensile elastic modulus, and 100% modulus). These gradient structures may be formed by varying one or more printer settings (e.g., a ratio of two or more input materials to a mixing chamber, a spin speed of an impeller in the mixing chamber, a sequence of materials into a mixing chamber, and a position of one or more valves to control material inputs into the mixing chamber, total combined volumetric flow rate of one or more input materials to a mixing chamber, nozzle tip height relative to the substrate, target temperature of the mixing chamber and/or the substrate, target catalyst concentration of the resulting mixed material, target line width of the printed material, target fumed silica concentration of the printed composite, target viscosity of the printed composite at the point of exiting the nozzle, and target concentration of an additive) while a 3D printer is printing the part. For example, the gradient structure may be formed by varying the ratio of two material inputs into a mixing nozzle. The inventors have appreciated that existing techniques for generating printer instructions for a 3D printer, such as those implemented in conventional slicer software applications, may be unable to recreate these gradient structures. Accordingly, aspects of the present disclosure relate to a computer program that is configured to generate print instructions that comprise changes to printer settings while the print heard is moving along a print path to accurately create these gradient structures.

The computer program may be configured to receive object information, such as a design file for a 3D article comprising a gradient structure (e.g., from a computer-aided design (CAD) program) and/or a print path for printing a 3D article (e.g., from a slicer application) with metadata indicative of material properties at various points along the print path, and output print instructions that may be provided to a 3D printer to accurately create the 3D article. The computer program may generate these print instructions by identifying gradient structures in the 3D article (e.g., a bounded volume in the 3D structure where the material properties are non-uniform) and identifying the appropriate set of printer settings for various points along the print path to create the gradient structure. In some embodiments, identifying the appropriate set of printer settings comprises identifying one or more material inputs to the 3D-printer and/or calculating a set of ratios of two or more material inputs. For example, the computer program may identify a bounded volume in the 3D article where a color transition occurs from a first color formed by a first pigment to a second color formed by a second pigment. In this example, the computer program may identify the printer settings required to reduce (e.g., ramp down) the deposition rate of the first pigment and increase (e.g., ramp up) the deposition rate of the second pigment to achieve the color transition. Once the appropriate set of printer settings have been identified, print instructions may be generated using the identified set of printer settings. For example, print instructions may be generated that comprise a print path for the print head to follow and printer settings information indicative of the appropriate printer settings at a plurality of points along the print path. In certain cases, the print instructions may be in machine readable code.

In some embodiments, a computer program may be configured to receive information related to the status of one or more parts of the 3D-printer. The computer program may be configured to output print instructions based on the status information. For example, the computer program may identify a volume of material occupying a mixing chamber (and/or a volume of material that the mixing chamber contains when full), and output print instructions based, at least in part, upon that volume. The print instructions may be applied at a point in time in advance of the point in time at which the material to which they apply is deposited by a nozzle. Similarly, the print instructions may be applied when a nozzle depositing the material to which they apply is at a position in space different than the position it will occupy when the material to which the print instructions are applied is deposited. In other words, the print instructions may be volume shifted. Because the mixing chamber has a finite volume, material that is input into the mixing chamber will not be printed until the material already in the mixing chamber has been printed. Thus, it may be beneficial to apply print instructions in advance of the point in time at which their effect is desired. Volume shifted print instructions may result in variations in the composition of the material in the mixing chamber as a function of position. In other words, a 3D-printer receiving volume shifted print instructions may include a mixing chamber comprising material with a spatial variation in composition (e.g., from top to bottom).

The computer program may comprise a set of instructions that may be executed by a computer system comprising a processor (e.g., a hardware processor or a virtual processor) and a memory (e.g., a non-transitory computer readable medium). For example, the computer program may comprise a set of instructions stored in a non-transitory computer readable medium that programs at least one processor coupled to the non-transitory computer readable medium. It should be appreciated that the computer system may be communicatively coupled to a 3D printer and/or integrated with the 3D printer.

Figure 7:
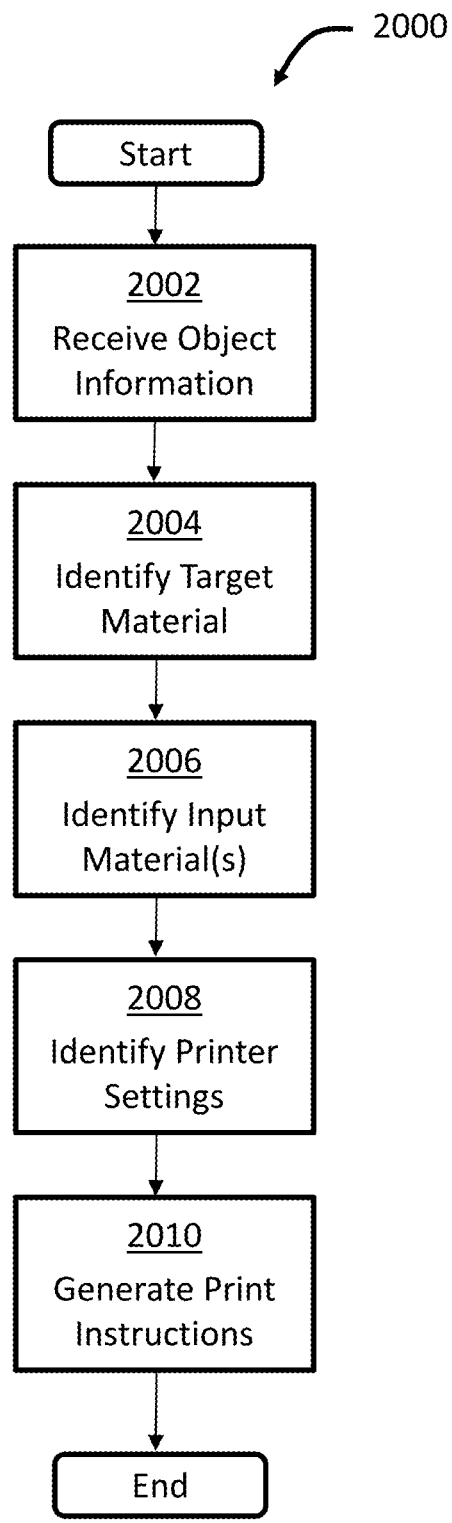
FIG. 7 illustrates an implementation of a computer program according to certain embodiments of the invention.

In some embodiments, the computer program may comprise a plurality of instructions that program at least one processor to perform a method 2000 in FIG. 7. As shown, the method 2000 comprises an act 2002 of receiving object information, an act 2004 of identifying a gradient structure, an act 2006 of identifying input materials to form the gradient structure, an act 2008 of identifying printer settings for the gradient structure, and an act 2010 of generating print instructions.

In act 2002, the system may receive object information associated with a 3D article that comprises a gradient structure. The object information may be, for example, a design file for a 3D article to be printed. The design file may comprise information indicative of one or more properties of the 3D article such as shape, material composition, and/or color. The design file may be in any of a variety of formats. Example formats include: Drawing Interchange Format (DXF), COLLAborative Design Activity (COLLADA), STereoLithography (STL), Initial Graphics Exchange Specification (IGES), Virtual Reality Modeling Language (VRML), PDF, EPS, and AI. Alternatively (or additionally), the object information may comprise a print path for a print head to follow to print the 3D article (e.g., generated by a slicer application) and information indicative of the desired material properties at various points along the print path. For example, the object information may comprise a print path comprising a plurality of points and metadata associated with one or more (or all of) the plurality of points indicative of a desired material property at the point (e.g., color, average stiffness, average Shore A hardness, average pore size, average density, surface roughness, reflectivity, strength, elongation at break, tensile elastic modulus, and 100% modulus, etc.). In some implementations, the metadata may be directly associated with one or more points in the plurality of points. In other implementations, the metadata may be stored in another format and overlaid onto the print path to determine the material properties at a given point. For example, the metadata may be desired color information stored in an image comprising a plurality of pixel values that may be overlaid onto the print path. In this example, the pixel value that aligns with a given point in the print path may be the metadata associated with the respective point.

In act 2004, the system may identify a gradient structure in the object information. A gradient structure may be identified by, for example, identifying a volume (e.g., a bounded volume) in the 3D article that has at least one non-uniform material property. Thereby, portions of the 3D article with uniform material properties may be separated from portions of the 3D article with non-uniform material properties. Once the portions of the 3D article with non-uniform material properties have been identified, the system may identify a constant set of printer settings for printing the remaining portions (e.g., the uniform portions) of the 3D article. In one implementation for illustration, the system may read metadata associated with one or more points in a print path to identify a subset of points (e.g., a continuous and/or contiguous subset of points) along the print path with non-uniform metadata to identify a gradient structure.

In act 2006, the system may identify input material(s) to create the gradient structure. For example, the 3D printer may print the material in the gradient structure by mixing a first material with a second material. In this example, the system may identify the first and second materials. The system may identify this information by, for example, identifying a material in the gradient structure and retrieving information stored in a memory of the computer system regarding the input materials required to create the identified material in the gradient structure.

In act 2008, the system identifies one or more printer settings for the gradient structure using the identified input materials. In some embodiments, the system may identify one or more printer settings required to achieve the desired material properties at a plurality of discrete points in the gradient structure. Once the printer settings for the plurality of discrete points have been identified, the system may employ interpolation techniques (e.g., linear interpolation and cubic interpolation) to smooth shifts in printer settings between the discrete points. Thereby, the system may generate a set of printer settings that may be employed to create the gradient structure. In one example for illustration, the system may identify that the mixing ratio of two materials needs to be 40/60 at a first point in the gradient structure and a 50/50 ratio at a second point in the gradient structure. In this example, the system may fit a linear curve between the first and second points to create a smooth ramp between a 40/60 ratio and a 50/50 ratio. Thereby, the system may create a set of printer settings to employ along the print path as the print head moves from the first point to the second point.

In act 2010, the system may generate the print instructions using the identified printer settings in act 2008. The print instructions may comprise, for example, a print path for a print head to follow to print the 3D article along with printer settings at a plurality of points along the print path (e.g., generated in act 2008). The print instructions may be, for example, G-code instructions. Once the print instructions have been generated, the system may transmit the print instructions to a 3D printer (and/or one or more other components of a 3D printer in embodiments where the computer system is integrated with the 3D printer).

According to some embodiments involving one or more non-3D-printing steps, the computer program may be configured to generate machine instructions that may be provided to a printing nozzle and/or a robotic gantry to accurately dispense a curable liquid into a mold (e.g., a negative secondary mold).

Figure 8:
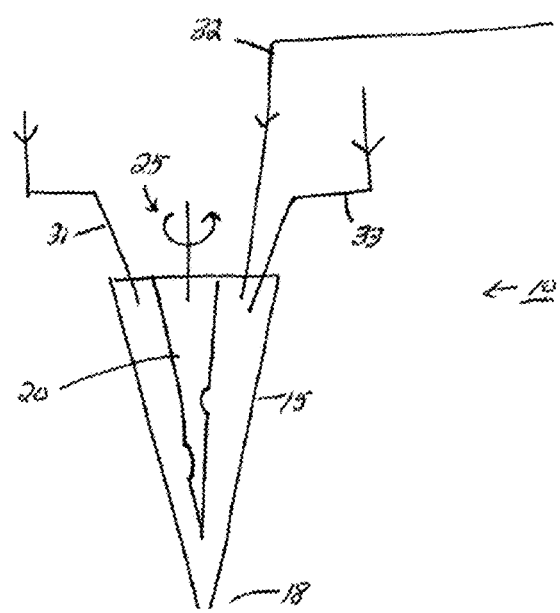
FIG. 8 illustrates a method for 3D printing an article according to certain embodiments of the invention.

FIG. 8 shows an example of a method for 3D-printing an article in accordance with some embodiments (e.g., on a multi-axis system as described above). In this figure, a device 10 for printing an article is shown, using techniques such as 3D printing. The device may include a nozzle 15, through which material is directed at a substrate through outlet 18. In some embodiments, the material may conformally coat the substrate after exiting through the nozzle. As described above, the substrate may be planar, or in some cases, the substrate may have a different shape (e.g., a curved shape). The substrate may thus be any suitable target for a material exiting the nozzle. For instance, the substrate may include a mold to which the material is applied or may be a component of an article of footwear (e.g., an upper). In some embodiments, the substrate itself may be produced by a 3D-printing process prior to 3D-printing the article. Without wishing to be bound by theory, printing onto 3D-printed substrates (e.g., 3D-printed molds) may yield 3D-printed articles that are smooth and/or have curved surfaces. In some embodiments, the substrate may be scanned using one or more sensors prior to printing. In some embodiments, data received during scanning may at least partially determine one or more movements of the nozzle during printing.

Nozzle 15 in FIG. 8 is generally depicted as being conical or funnel-shaped, although it should be understood that this is by way of example only, and the nozzle may have any suitable shape able to direct a material at a substrate. Further non-limiting examples of methods for 3D printing may be seen in a U.S. provisional patent application filed on Feb. 27, 2017, entitled "Techniques and Systems for Three-Dimensional Printing of Foam and other Materials," incorporated herein by reference in its entirety.

In some embodiments, a substrate may be translated and/or rotated with respect to a nozzle as described above during a 3D-printing process (e.g., a multi-axis robot may translate the substrate with respect to the nozzle, which may allow material to be extruded onto various portions of the substrate). In some embodiments, the nozzle may be translated and/or with respect to the substrate as described above.

In addition, in some embodiments, the material within the nozzle may be subjected to heating or cooling. This may, for example, be used to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. In some cases, the temperature may be altered by at least 5° C., at least 10° C., or by other ranges such as those discussed herein. Any method may be used to heat or cool the material within the nozzle. For example, heating or cooling may be applied to the nozzle itself, and/or to material within the nozzle. Non-limiting examples include electrical heating, Peltier cooling, application of infrared light, or other techniques such as those discussed herein.

As mentioned, one or more fluids may enter the nozzle to be mixed together. The fluids may enter via a common inlet, and/or via separate inlets, for example, as is illustrated in FIG. 8 with inlets 31, 32, and 33. Although 3 inlets are illustrated in this figure, this is by way of example only, and in other embodiments, more or fewer inlets are also possible. The inlets may independently be at the same or different distances away from an outlet of the nozzle. In some cases, the fluids may react upon contact with each other; thus, the fluids are kept separate prior to entrance into the nozzle, for example, using one or more inputs and/or valves to control contact of the fluids with each other. For example, one or more valves may be present on one or more of the inlets to control the flow of fluid through the inlets, e.g., into the nozzle. Examples of valves that can be used include needle valves, ball valves, gate valves, butterfly valves, or other suitable types of valves. Additionally, other types of apparatuses to control fluid flow may also be used, in addition to and/or instead of valves.

Fluids entering a mixing nozzle may be provided to the mixing nozzle in a variety of suitable manners. In some embodiments, fluids enter a mixing nozzle by flowing therein from a material supply tube. Material supply tubes may be connected to sources of the material, such as material reservoirs. In some embodiments, material supply tubes and/or material reservoirs may be configured to be held at a desired temperature. For instance, fluid may enter a mixing nozzle from a heated material supply tube and/or from a material supply tube fluidically connected to a heated material reservoir. As another example, fluid may enter a mixing nozzle from a cooled material supply tube and/or from a material supply tube fluidically connected to a cooled material reservoir. Without wishing to be bound by any particular theory, it is believed that temperature control may advantageously prevent and/or reduce crystallization of one or more components of one or more of the fluids entering the mixing nozzle and/or prevent and/or reduce phase separation of two or more components of one or more of the fluids entering the mixing nozzle. It may also allow materials that are solid at room temperature to be printed in liquid form.

Some embodiments are directed to methods of printing an article, which may include flowing at least two materials into a mixing chamber. In some embodiments, at least one of the materials is polymeric. The method may involve in some embodiments mixing the at least two materials in the mixing chamber containing an impeller to form a mixture. The method may also include depositing the mixture onto a textile. In some embodiments, the mixed material flows through an orifice and onto the surface of a textile.

In some embodiments, the method may involve flowing the at least two materials into the mixing chamber while rotating the impeller in the mixing chamber. The impeller may cause two or more materials in the mixing chamber to mix. In some embodiments, the mixing chamber contains at least a portion of the impeller. The term "mixing chamber" may refer to the volume in which the at least two materials that are mixed together occupy from when they first touch each other, to when they stop being mechanically influenced by active motion of a mixing part (e.g., impeller). In some embodiments, the mixing chamber and the impeller share at least some volume, e.g., the impeller occupies at least some of the dead volume of the mixing chamber.

In some embodiments, the method may involve flowing the at least two materials into the mixing chamber through at least three discrete material inlets. In such embodiments, there may be at least three materials flowed into the mixing chamber. In some embodiments, the method may involve flowing the at least two materials into the mixing chamber through at least four discrete material inlets. In such embodiments, there may be at least three or four materials flowed into the mixing chamber.

In some embodiments, the mixture is a liquid. In some embodiments the mixture is in direct fluid communication with the mixing chamber during the time of deposition onto the substrate (e.g., textile). As a non-limiting example, the mixture is not jetted into discrete droplets from a standoff distance from the substrate (e.g., textile), but instead contacts simultaneously an outlet from the mixing chamber (e.g., nozzle orifice) and the substrate (e.g., textile) while the mixture is continuous with itself.

In some embodiments, the method may involve controlling the execution of the method using a controller. The method may involve varying the volumetric flow ratios of the at least two materials based on the spatial location of the mixing chamber with respect to the textile. In some embodiments, the change in the volumetric flow ratios between the at least two materials changes at least one property of the deposited mixture. In some embodiments, at least two of the at least two materials undergo a chemical reaction that changes at least one property of the deposited mixture. In some embodiments, the change in the volumetric flow ratios between the at least two materials changes at least one property of the deposited mixture after a chemical reaction has occurred in the deposited mixture. The change in the volumetric flow ratios between the two or more materials may influence the properties of the deposited structure before all chemical reactions have occurred, after all chemical reactions have occurred, or both before and after chemical reactions. In some embodiments, the at least one property that has changed is selected from the group consisting of tensile elastic modulus, tensile strength, tensile 100% modulus, hardness, viscosity, dynamic yield stress, static yield stress, density, particle concentration, color, opacity, and surface roughness, or a combination thereof.

In some embodiments, the textile onto which the mixture is deposited is substantially flat (e.g., it may be a flat plate). In some embodiments, the textile conforms to a substrate that is curved in one or more dimensions (e.g., two or three dimensions). Without wishing to be bound by any particular theory, it is believed that substrates that are curved in one or more dimensions may promote curing of material deposited thereon (e.g., polymeric material deposited thereon) in an advantageous shape (e.g., a shape similar to a final shape desired for an application, a shape more similar to the final shape desired for the application than the shape formed by the material if cured on a flat substrate). The textile may be disposed on a fixture, such as a fixture configured to interact with a 3D-printer. In some embodiments, the textile is supported by a belt that can translate the textile in one or more dimensions (e.g., two or three dimensions) and/or through a sequence of one or more processes. In some embodiments, the textile is handled in a roll to roll process. In some embodiments, the textile itself acts as a belt that can move the textile surface with respect to the mixing chamber. In some embodiments, the textile is a component of a footwear upper (e.g., a shoe upper). In some embodiments, the textile is a component of apparel, a component of an article of sportswear, a component of an article of sporting goods (e.g., a glove, a grip, a tent), a component of an article of clothing (e.g., a shirt), and/or a component of a bag. In some embodiments, the textile is a component of a knit shoe upper. In some embodiments, the textile is an article of apparel, an article of sportswear, an article of sporting goods, an article of clothing (e.g., a shirt), and/or a bag.

In certain cases, a mixture may be deposited onto an article disposed on a substrate. The article may be a component of an article of footwear (e.g., an upper), or may be an article of footwear (e.g., a shoe). The substrate may be configured to hold the article in an advantageous shape, such as an advantageous shape for footwear applications. In some embodiments, the substrate may be a shoe last. Non-limiting examples of suitable combinations of substrates and articles include lasted three-dimensional shoe uppers on shoe lasts, lasted full shoes on shoe lasts, textiles cut into the shape of upper flat patterns in a flat form factor, and textiles cut into the shape of upper flat patterns disposed on a substrate that is curved in at least one dimension. Other types of articles and substrates are also possible.

In some embodiments, at least one of the at least two materials comprises a filler and the article is a polymeric composite. In some embodiments, at least one of the at least two materials comprises isocyanate groups. In some embodiments, at least one of the at least two materials have functional groups (e.g., chemical functional groups) selected from the group consisting of alcohol groups, amine groups, or combinations thereof. In some cases, more than two materials may be flowed into a mixing chamber (e.g., three materials, four materials, or more materials). When two or more materials are flowed into the mixing chamber, each material may comprise different functional groups from each other material, or two or more materials may comprise the same functional group. For example, a first material may have an isocyanate functional group and a second material may have an alcohol functional group. As another example, three materials comprising an alcohol functional group (e.g., polyols) and one material comprising an isocyanate functional group may be flowed into a mixing chamber. As a third example, two materials comprising a first functional group (e.g., an alcohol functional group) and two materials comprising a second functional group (e.g., an isocyanate functional group) may be flowed into the mixing chamber.

In some embodiments, the method may involve flowing a material comprising an isocyanate group through an inlet into the mixing chamber. In some embodiments, the material comprising an isocyanate group is selected from the group consisting of an isocyanate, an isocyanate prepolymer, and a quasi-isocyanate prepolymer, or a combination thereof. In some embodiments, the method may involve flowing a short chain extender through an inlet into the mixing chamber. In some embodiments, the short chain extender has a number average molecular weight of e.g., less than 5000 Dalton, less than 4000 Dalton, less than 3000 Dalton, less than 2000 Dalton, less than 1000 Dalton, less than 500 Dalton, less than 100 Dalton, or less than 90 Dalton. In some embodiments, the short chain extender has a number average molecular weight of less than 1000 Dalton. In some embodiments the chain extender is butanediol with a molecular weight of 90.12 g/mol. In some embodiments, e.g., at least 20%, at least 30%, at least 40%, at least 50%, at least 60%, at least 70%, at least 80%, or at least 90%, or at least 99% of the molecules of the short chain extender have at least two functional groups per molecule. In some embodiments, at least 70%, of the molecules of the short chain extender have at least two functional groups per molecule. In some embodiments, the at least two functional groups per molecule comprise at least two alcohol groups. In some embodiments, the at least two functional groups per molecule comprise at least two amine groups. In some embodiments, the at least two functional groups per molecule comprise at least one alcohol group and one amine group. In some embodiments the short chain extender may comprise a blend comprising molecules with two alcohol groups and comprising molecules with two amine groups. In some embodiments, the method may involve flowing a higher molecular weight (e.g., number average molecular weight) polyol and/or polyamine through an inlet into the mixing chamber (e.g., molecular weight e.g. greater than 100 Daltons, greater than 200 Daltons, greater than 300 Daltons, greater than 400 Daltons, or greater than 500 Daltons). In some embodiments, e.g., at least 20%, at least 30%, at least 40%, at least 50%, at least 60%, at least 70%, at least 80%, or at least 90%, or at least 99% of the molecules have a molecular weight greater than 90 Daltons. In some embodiments, at least 70% of the molecules have a molecular weight greater than 90 Daltons. In some embodiments, e.g., at least 20%, at least 30%, at least 40%, at least 50%, at least 60%, at least 70%, at least 80%, or at least 90%, or at least 99% of the molecules have a molecular weight greater than 200 Daltons. In some embodiments, at least 70% of the molecules have a molecular weight greater than 200 Daltons. In some embodiments, the method may involve flowing polyols with a concentration of added fumed silica e.g. greater than 0.1 percent by weight, greater than 0.2 percent by weight, greater than 0.5 percent by weight, greater than 1 percent by weight, greater than 2 percent by weight, greater than 3 percent by weight, greater than 4 percent by weight, greater than 5 percent by weight, greater than 10 percent by weight, greater than 20 percent by weight, greater than 30 percent by weight, greater than 40 percent by weight, greater than 50 percent by weight, greater than 60 percent by weight, greater than 70 percent by weight through an inlet into the mixing chamber. In some embodiments, the method may involve flowing polyols with a concentration of added fumed silica greater than 3 percent by weight through an inlet into the mixing chamber.

In some embodiments, additional material inlets may be utilized to control the insertion of pigments of dyes to control the RGB color of the deposited material. In some embodiments, the method may involve flowing a pigment and/or a particle through an inlet into the mixing chamber. Any of the materials flowed into the mixing chamber may also contain pigments and/or particles. In some embodiments, the pigments and/or particles may be flowed into the mixing chamber while contained in a fluid in a pigment and/or particle concentration of e.g. greater than 1 percent by weight, greater than 2 percent by weight, greater than 3 percent by weight, greater than 4 percent by weight, greater than 5 percent by weight, greater than 10 percent by weight, greater than 20 percent by weight, greater than 30 percent by weight, greater than 40 percent by weight, greater than 50 percent by weight, greater than 60 percent by weight, greater than 70 percent by weight.

In one non-limiting set of embodiments, one material that is flowed into the mixing chamber, Part A, is the curing agent that binds another three materials together. One or more of the materials bound together by Part A may affect the properties of the mixture of the four materials (i.e., the uncured material) and/or the properties of the deposited material after curing has completed (i.e., the cured material). In one non-limiting set of embodiments, there are three different Part B's flowed into the mixing chamber along with Part A: Part B1, which makes the cured material stiff; Part B2, which reduces the viscosity of the uncured material and makes the cured material soft; and Part B3, which increases the viscosity of the uncured material and makes the cured material soft. The volumetric flow rate ratios for B1 to B2 to B3 into the mixing chamber can be controlled to control properties (e.g., stiffness and viscosity) of the mixture. The volumetric flow rate of A into the mixing chamber can be determined, e.g. based on what is necessary to complete all chemical reactions for the ratio of Part B's, and controlled by a controller.

In some embodiments, one or more properties of a mixture that is 3D-printed from a nozzle may change as a function of time and/or nozzle position with respect to the substrate. For instance, the composition of one or more components and/or the wt. % of one or more components within the mixture may change as a function of time. In some embodiments, one or more physical parameters of the nozzle and/or the substrate may change as a function of time. As an example, the temperature of the nozzle and/or the substrate may change as a function of time. Without wishing to be bound by theory, the temperature of the nozzle and the temperature of the substrate may affect the types of reactions that occur between various components (e.g., cross-linking reactions, foaming reactions, reactions within the nozzle, reactions on the substrate) and/or the rates at which these reactions occur. This may in turn affect the chemical structure of the mixture (e.g., the composition of the mixture, the degree of cross-linking of the resultant foam) during and/or after printing, and/or affect one or more physical properties of the mixture (e.g., the viscosity of the mixture, the average pore size of the resultant foam, the density of the resultant foam, the stiffness of the resultant foam, the Shore A hardness of the resultant foam) during and/or after printing. In some embodiments, changes in substrate or nozzle temperature during printing may allow for different portions of the 3D-printed article (e.g., those printed at different times and/or in different positions on the substrate) to have different chemical or physical properties. In some embodiments, the portions with different chemical and/or physical properties may be printed in a single continuous process, and/or may together form a single integrated material.

The Inventors recognized the problem that some particles (e.g., fumed silica), which can be used to change the rheology and/or mechanical properties of a material (e.g., a polymeric material), are difficult to use in spraying methods for deposition of material. The degree of particle incorporation may be useful, for example, in controlling whether a material deposited onto a fabric sits on top of the fabric (e.g., material with a sufficient volume percent of the particles) or seeps into the fabric. As an alternative to incorporating particles into a material, the Inventors have determined that exposing a light-curable material to light (e.g., UV light) of an appropriate curing wavelength upon the material exiting a printing nozzle, or after a predetermined delay between exiting the printing nozzle and light exposure, results in a similar rigidifying effect on the material to that resulting from particle incorporation. The Inventors have further determined that light curing can be used to control the mechanical properties of materials that can be deposited by spraying (e.g., using compressed gas to aerosolize the material), which may result in both better mechanical properties control and higher throughput relative to other printing methods. In addition, the Inventors have determined that combining a printing nozzle (e.g., having a mixing chamber and an impeller disposed in the mixing chamber) configured to actively mix small volumes of material with a compressed gas source, an outlet of which printing nozzle intersects with an outlet in fluid communication with the compressed gas source, a print head with spraying capabilities results in which input ratios (e.g., volume ratios) into the printing nozzle, and therefore material composition of the sprayed material, can be changed on the fly.

Figure 3A:
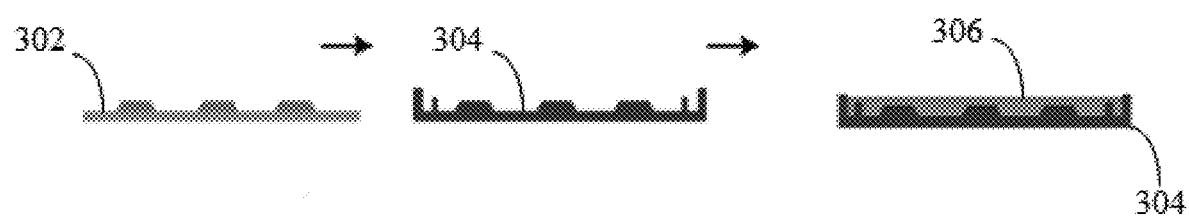
FIGS. 3A-3D illustrate a digital molding process according to certain embodiments of the invention.
Figure 3B:
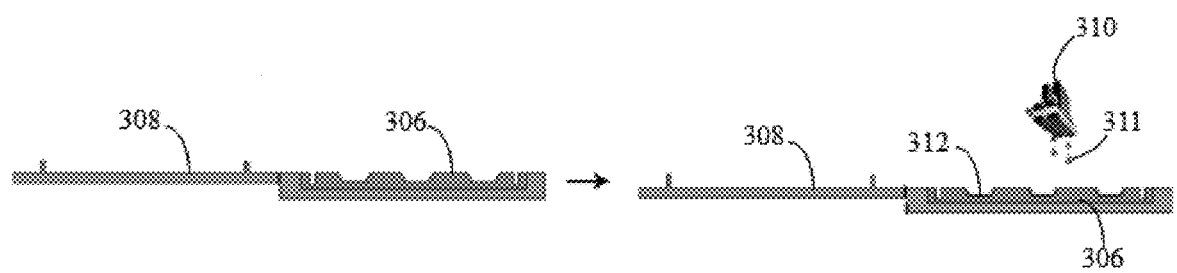
Figure 3C:
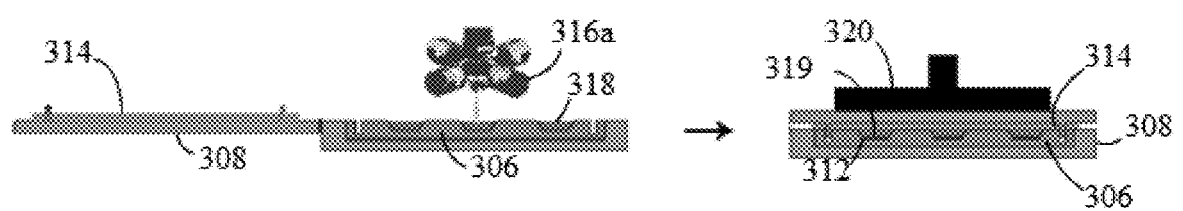

According to certain embodiments, FIGS. 3A-3C illustrate a digital molding process as described herein. Referring to FIG. 3A, computer-aided design (CAD) model 302 of a desired mold may be produced by a user. In some embodiments, first mold 304 (e.g., master mold) may be manufactured by an additive manufacturing process (e.g., 3D-printing). First mold 304 may be printed using any of the 3D-printing techniques described herein. In some cases, as shown in FIG. 3A, first mold 304 may be a positive master mold manufactured by additive manufacturing. Negative master molds are also possible, according to some embodiments. A positive (or negative) master mold may be additively manufactured with any of a variety of suitable technologies, including, but not limited to, stereolithography, solid deposition modeling, inkjet printing, binder jet printing, multi-jet fusion, digital light processing, and/or thermoplastic powder sintering. In certain embodiments, the master mold may be manufactured such that the master mold can be 3D-printed without a support material.

In certain non-limiting embodiments, for example, the first mold may be a positive master mold that is manufactured with the intention of casting another substance into the positive master mold to create a second mold (e.g., a negative secondary mold), as explained herein in greater detail. In certain embodiments, a single master mold (e.g., a positive master mold) may be used to produce multiple second molds (e.g., negative secondary molds), therefore lowering overall production costs as the single master mold is recycled and reused.

The 3D-printed positive or negative master mold may be manufactured from any suitable material, including, but not limited to, photopolymers, thermosets, thermoplastics, metals, and/or composites.

According to some embodiments, a master mold may also be manufactured through other processes, such as computer numerical control (CNC) machining and/or laser cutting. In certain embodiments, a master mold may be manufactured through multiple processes. For example, a master mold could be partly composed of a machined part, but may also have 3D-printed parts attached to the machined areas such that the machined base is configured to hold the 3D-printed parts in the right locations, and create strength.

In some embodiments, a 3D-printed master mold may also be post-processed after being manufactured. Any of a variety of suitable post-processes steps may be used. Some examples of post-processing steps include, but are not limited to, sandblasting, spray-coating, polishing, UV post-curing, and the like. In some embodiments, the post-processing step may be used to adjust the texture of the master mold, for example, to make the neutral surface of the mold surface more matte or glossier.

First mold 304 (e.g., positive master mold) may have a texture comprising one or more features (e.g., one or more protrusions, ridges, posts, cavities, etc.). According to certain embodiments, the texture comprising one or more features may be directly printed into the first mold, in the case of additively manufactured molds. In some embodiments, the texture comprising one or more features may be directly machined into the first mold, in the case of machined molds. The texture comprising one or more features may also be applied to the first mold with a post-processing technique (e.g., sand blasting, bead blasting, and/or polishing), in some embodiments. As would generally be understood by a person of ordinary skill in the art, the texture comprising one or more features in the first mold (e.g., the positive master mold) may be imparted on the second mole (e.g., the negative secondary mold) that is cast into the first mold, and in-turn imparted on the curable liquid that is dispensed into the second mold. In certain embodiments, the one or more features may be patterned. In other embodiments, the one or more features are random. In some embodiments, the first mold may have particular markings printed (and/or machined) into the mold. Markings include, but are not limited to, logos, text, branding, reliefs, and the like.

In some embodiments, it can be useful deposit material onto surfaces by spraying rather than by extrusion alone through a nozzle. Advantages of spraying relative to extrusion alone may include but are not limited to deposition of thinner films with no extrusion lines; reduced sensitivity to nozzle standoff distance from the substrate; and/or a capacity to create wider strips of material in one pass to reduce cycle time. Other advantages of spraying relative to extrusion alone may include limited accumulation or no accumulation of cured material on the nozzle, which may be because spraying may not require the spray nozzle to come into direct fluid communication with material that has already been deposited. In addition, coatings made by spraying can be applied conformally to three-dimensional (3D) surfaces without precise alignment or 3D tool-pathing.

In some embodiments, it is possible to make slight modifications to a mixing nozzle (e.g., a 4-input dynamic mixing nozzle) to convert it into a spray nozzle. In order to do this, a compressed gas guiding sheath fluidly connected with a compressed gas source may be attached around the outside of the nozzle. In some embodiments, a configuration of an impeller disposed in the mixing chamber of the mixing nozzle ensures that a small mixing volume is retained such that rapid changes in the sprayed material composition can be executed. In some embodiments, the compressed gas guiding sheath (e.g., air guiding sheath) is configured to guide the flow of compressed gas from a compressed gas source to atomize the output of the nozzle into small droplets immediately upon exiting the nozzle. In some embodiments, the small droplets are then propelled through the air to land on a target substrate. In some embodiments, ratio(s) (e.g., volume ratios) of the inputs (e.g., 4 inputs) into the mixing chamber can be changed in space and time to vary the composition of the material that is sprayed. In some embodiments, the geometry of the compressed gas guiding sheath and/or the applied pressure from the compressed gas can be used to change the shape and velocity of the cone of atomized material that is deposited. In some embodiments, the standoff distance from the substrate can be used to control the width of the sprayed strips.

A potential limitation of spraying (e.g., spraying a mixture of chemically reactive materials) may be that depending on the applied pressure from the compressed gas through the compressed gas guiding sheath, the sprayed films that are deposited onto the substrate can be deformed after deposition by the force of the compressed gas blowing against them. In embodiments where spraying a mixture of chemically reactive materials occurs, one solution to this problem may be to induce the mixture of materials to react more quickly and become solid very quickly so that the mixture can withstand the forces of the compressed gas without permanent deformation. However, this solution may create risks of accumulating cured material inside of a mixing nozzle (e.g., inside of a mixing chamber) during deposition. Another solution may be to add a UV-curable component to one or more inputs that are mixed together in the mixing chamber. As a non-limiting example, free radical polymerization between materials with alkene functional groups (e.g., acrylates, methacrylates, vinyls) may proceed very rapidly (e.g., in fractions of a second) when exposed to high power UV irradiation, but may also remain stable for months when not exposed to UV irradiation. After adding a UV-curable component to the mixture, the mixture can be exposed to UV irradiation directly as it exits the mixing chamber. The exposure to UV irradiation may increase the viscosity of the resulting material very rapidly to the consistency of a non-flowing paste or gel that can withstand forces from the compressed gas without deformation. This rapid increase in viscosity may also prevent the deposited material from soaking into porous fabrics, and may enable structures of substantial thickness to be built up. Since the UV-curable components of the system may represent only a fraction of the total functional groups that have the capability of reacting to form a solid polymer, the deposited material may continue to increase in viscosity, and also may form chemical bonds with previously deposited material as functional groups in the mixed material (e.g., isocyanates and one or more of alcohol groups or amine groups) curable by means other than UV exposure continue to react with one another after the UV irradiation (e.g., high power UV irradiation) is removed. In some cases, a UV-curable component of the mixture may be a urethane acrylate that does not have any alcohol or isocyanate groups present on it. In some cases, UV-curable component(s) of the mixture may be present within the same molecule that also has one or more functional groups curable by means other than UV exposure (e.g., alcohol, amine, or isocyanate groups). The mass percentage of molecules that contain UV-curable functionality may be as high as 100% for any individual input. The mass percentage of molecules that contain UV-curable functionality may be as high as 60% for the final mixture in the case that molecules containing UV-curable functional groups are present on different molecules from the molecules containing one or more functional groups curable by means other than UV exposure (e.g., isocyanates, alcohols, or amines). In the case where UV-curable functional groups are present on the same molecules that also contain one or more functional groups curable by means other than UV exposure (e.g., isocyanates, alcohols, or amines), as much as 100% of the molecules may contain at least one UV-curable functional group. In the case that a hybrid UV-curable mixture is used, wherein UV-curable functional groups are present as well as one or more functional groups curable by means other than UV exposure, an irradiation source (e.g., a UV irradiation source, a light source, a UV light source) may be integrated into (or adjacent to) the print head, such that the hybrid UV-curable mixture may be UV cured immediately upon exiting the nozzle. The irradiation source (e.g., UV irradiation source) may comprise one or more UV LEDs, each with a peak wavelength between or equal to 200 nm and 405 nm. The irradiation source (e.g., UV irradiation source) may also comprise mercury lamps or bulbs. The irradiation source may also comprise a light source with a peak wavelength outside of the UV spectrum, provided that the intensity of irradiation in the UV spectrum is sufficiently high to activate a photoinitiator in the system. Additionally, the irradiation source may be one or more DLP (Digital Light Projection) projectors. The projectors may have lenses that direct the light (e.g., focus the light) onto a small region, but enable the light in that region to be patterned. The projectors can be used to change the shape of an image that is projected so that the light is directed only onto regions that require exposure.

In some cases, it may be advantageous for the hybrid UV-curable mixture to experience a delay between exiting the nozzle and initial exposure to the irradiation source (e.g., UV irradiation source). This delay may allow the deposited material to level and spread, and/or to soak into the surface of the substrate (e.g., the fabric surface) to some degree before the viscosity of the extruded material increases substantially. This leveling, spreading, and/or soaking in can produce more uniform and flat films deposited with this method, relative to immediate exposure of the mixture to the irradiation source as it leaves the nozzle. In other cases, it may be advantageous to have no delay in exposure of the mixture to the irradiation source as it leaves the nozzle, such that the material that is deposited holds its shape without spreading or leveling. In some cases, a region surrounding the nozzle tip may be exposed to irradiation (e.g., UV irradiation) continuously, and the rate of increase of viscosity of the mixture may be controlled by the mass fraction or volume fraction of UV-curable material present in the mixture, which can be controlled zonally by varying the ratios of two or more inputs into the mixing chamber.

It should also be understood that while the scope of this disclosure has focused on examples of functional groups curable by means other than UV exposure directed to polyurethane formulations, for spraying and/or extrusion of a hybrid UV-curable mixture, other material chemistries may be used to replace the polyurethane formulations. For example, a mixture for spraying and/or extrusion may be made with epoxies where one component contains epoxide functional groups, and another component contains amine functional groups. In another example of a mixture, one component may include siloxane functional silicone resins and a platinum catalyst, and another component may include vinyl functional silicone resins, which would react after mixing to form polydimethylsiloxane (PDMS) elastomers. Polydimethylsiloxane resins that cross-link through multiple chemistries may also be used (e.g., tin-cured, or acetoxy-based systems). Polydimethylsiloxane resins may also be partially or fully UV-curable, e.g., by adding acrylate functional groups to the silicone resins, or by employing a catalyst that is de-blocked by exposure to UV light.

Other variations of a nozzle include but are not limited to: a spray nozzle with a compressed gas source and/or a compressed gas guiding sheath without an irradiation source (e.g., without a UV light source) with at least two inlets to the nozzle, for depositing a reactive system having two or more parts without any UV-curable components; or a nozzle with two inlets and (in some cases without a compressed gas source or guiding sheath but) including an irradiation source (e.g., a UV irradiation source), for depositing by extrusion (in some cases without spray functionality) a reactive system having two or more parts with some irradiation-curable (e.g., UV-curable) components.

In any variation of the nozzle (e.g., mixing nozzle), the nozzle may have one input or two inputs or more than two inputs (e.g., 3, 4, 5, 6, 7, 8, 9, 10, or more inputs).

In some embodiments, a print head is provided.

Figure 9:
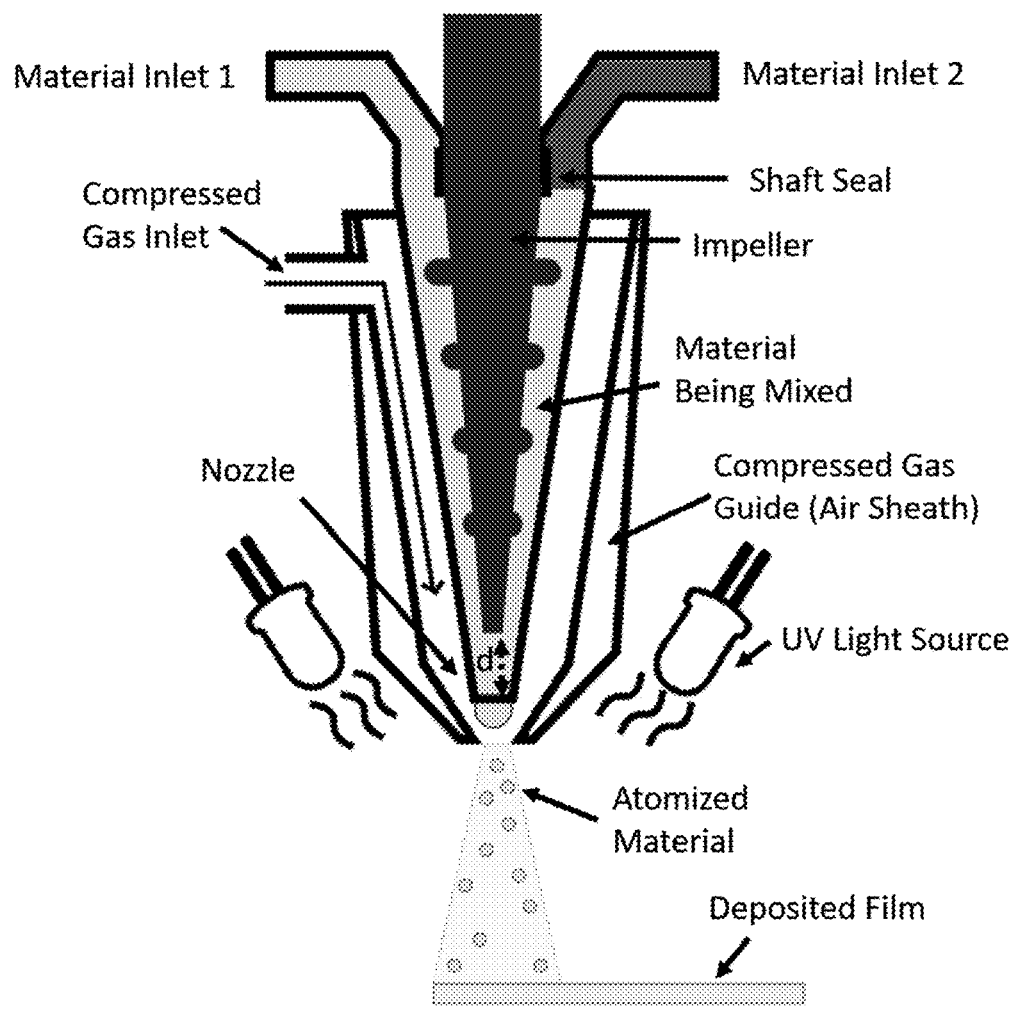
FIG. 9 is a schematic of an illustrative reactive spray print head with an integrated UV curing mechanism, in accordance with some embodiments.

The print head can have a printing nozzle, which can have a mixing chamber, an impeller disposed in the mixing chamber, and two or more material inlets in fluid communication with the mixing chamber (see, e.g., FIG. 9). In some embodiments, a tip of the impeller is less than 5 mm from an outlet of the printing nozzle. In some embodiments, an outlet of the printing nozzle (e.g., of the mixing chamber) is configured to intersect with an outlet fluidly connected to the compressed gas source (see, e.g., FIG. 9, FIG. 10). In some embodiments, a volume of the mixing chamber is less than 1 mL. In some embodiments, the volume of the mixing chamber is less than 250 microliters. In some embodiments, the mixing chamber is in fluid communication with three or more material inlets. In some embodiments, the mixing chamber is in fluid communication with four or more material inlets. In some embodiments, one or more of the material inlets is in fluid communication with a respective in-line rotary pump.

Figure 10:
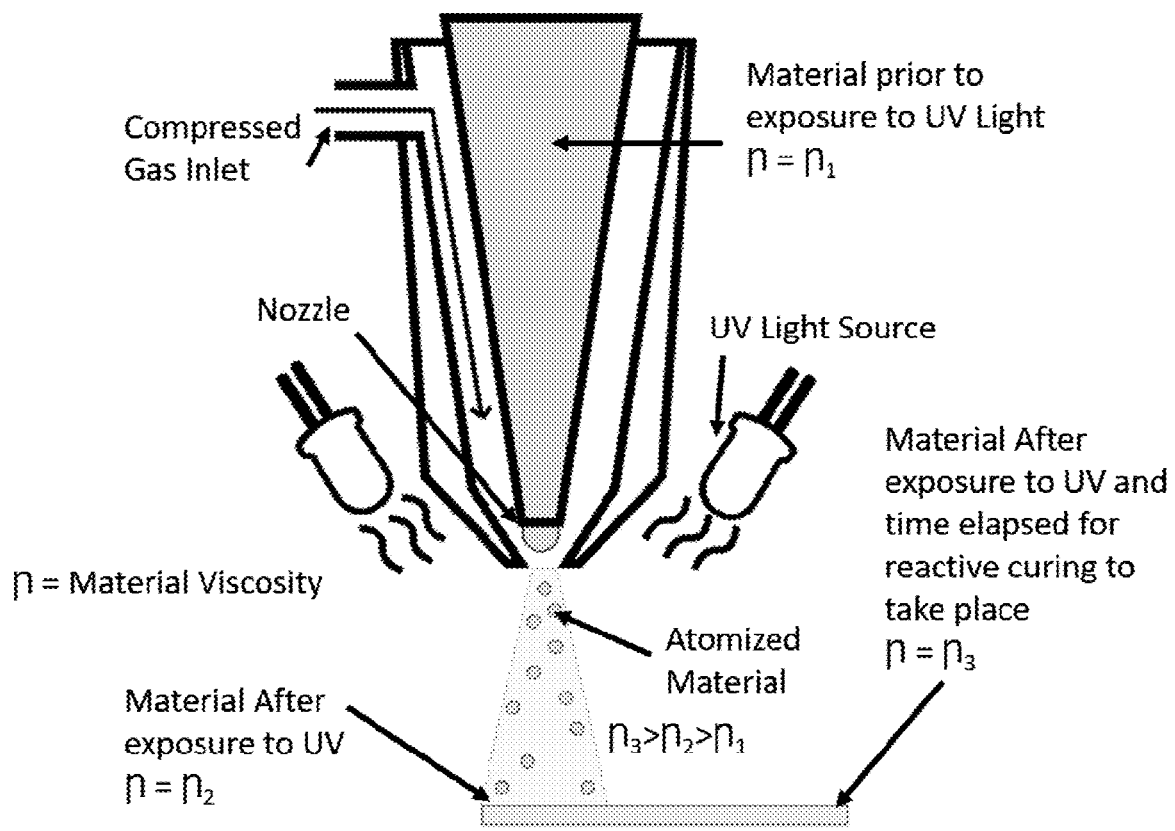
FIG. 10 is a schematic of an illustrative spray print head with an integrated UV curing mechanism, in accordance with some embodiments.
Figure 11:
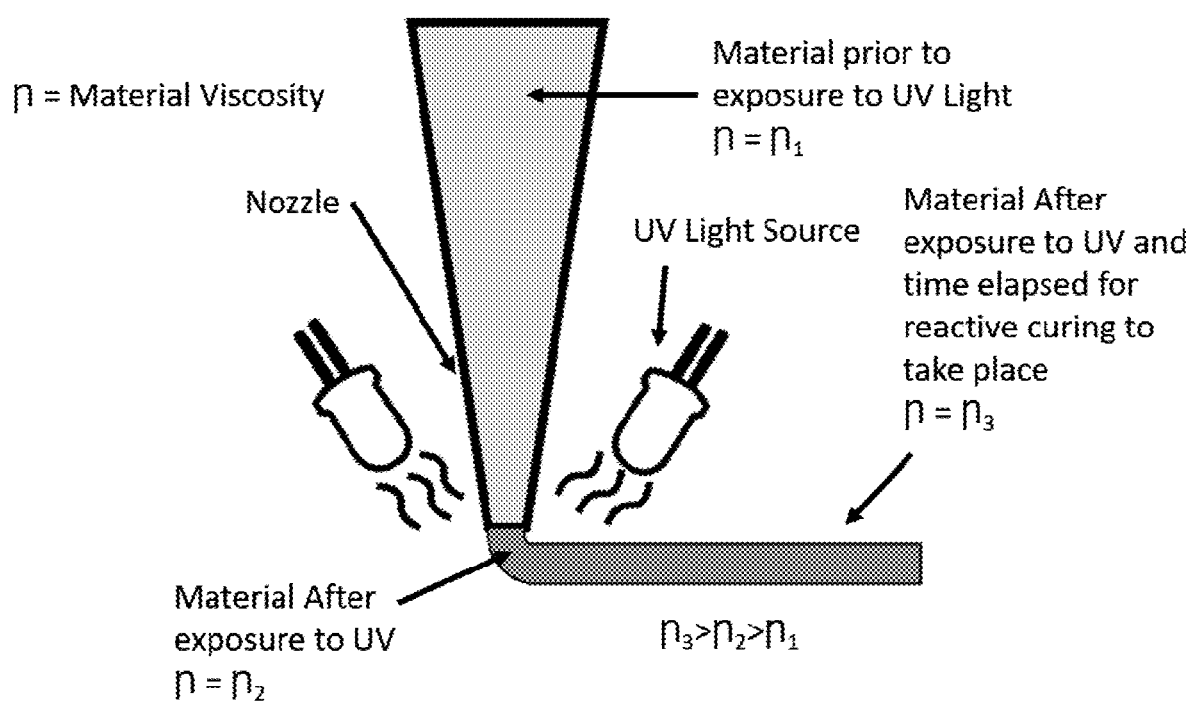
FIG. 11 is a schematic of an illustrative print head with an integrated UV curing mechanism, in accordance with some embodiments.

The print head can have a light source (e.g., an ultraviolet (UV) light source) adjacent to the printing nozzle (see, e.g., FIG. 9, FIG. 10, FIG. 11). In some embodiments, the light source (e.g., UV light source) comprises an emission wavelength between or equal to 200 nm and 405 nm. In some embodiments, the light source (e.g., UV light source) is configured to irradiate a material directly as the material exits the printing nozzle (e.g., exits the mixing chamber). In some embodiments, the light source (e.g., UV light source) is configured to irradiate a material after the material exits the mixing chamber with a predetermined delay. In some embodiments, the light source (e.g., UV light source) comprises an emission wavelength between or equal to 200 nm and 405 nm. In some embodiments, the light source (e.g., UV light source) comprises one or more light emitting diodes (LEDs) (e.g., UV LEDs). In some embodiments, the light source (e.g., UV light source) is one or more Digital Light Projectors (DLP).

The print head can have a compressed gas source (see, e.g., FIG. 9, FIG. 10). In some embodiments, the compressed gas source is configured to atomize a material extruded from the printing nozzle (e.g., from the mixing chamber). In some embodiments, the compressed gas source is in fluid communication with an electropneumatic regulator.

In some embodiments, the print head has a compressed gas guiding sheath fluidly connected to the compressed gas source (see, e.g., FIG. 9, FIG. 10). In some embodiments, an outlet of the mixing chamber is configured to intersect with an outlet of the compressed gas guiding sheath. In some embodiments, the compressed gas guiding sheath is a microfluidic gas guiding sheath. In some embodiments, the compressed gas guiding sheath (e.g., microfluidic gas guiding sheath) is actuatable such the sheath can be moved with respect to an outlet of the printing nozzle or vice versa. In some embodiments, the compressed gas guiding sheath (e.g., microfluidic gas guiding sheath) is coupled to the print head through magnetic attachment such that it can be easily removed. In some embodiments, the compressed gas guiding sheath (e.g., microfluidic gas guiding sheath) has multiple gas channels coupled to valves that can be addressed individually. In some embodiments, moving the sheath with respect to the outlet of the printing nozzle changes channels through which compressed gas is configured to flow, which changes the shape of an atomized material cone that is deposited onto the surface from the outlet of the printing nozzle.

In some embodiments, a method of printing a material is provided.

The method may comprise passing a formulation through a print head. In some embodiments, the method comprises mixing two or more parts of the formulation in a printing nozzle of the print head to form a mixture. In some embodiments, the method comprises exposing the formulation to light (e.g., UV light) for e.g., between or equal to 0.01 seconds and 10 seconds, or between or equal to 1 seconds and 3 seconds. In some embodiments, the method comprises exposing the formulation (e.g., mixture) to light at a wavelength within the absorption spectrum of the photoinitiator for e.g., between or equal to 0.01 seconds and 10 seconds, or between or equal to 1 seconds and 3 seconds. In some embodiments, the method comprises flowing compressed gas from the compressed gas source to atomize the formulation as it exits the nozzle. In some embodiments, the method comprises flowing compressed gas from the compressed gas source to atomize the formulation after it exits the nozzle with a predetermined delay.

In some embodiments, the formulation comprises two or more parts, and passing a formulation through the print head involves flowing at least two of the two or more parts of the formulation through a respective material inlet of the two or more material inlets into the printing nozzle. In some embodiments, the formulation comprises three or more parts, and passing a formulation through the print head involves flowing at least three of the three or more parts of the formulation through a respective material inlet of three or more material inlets into the printing nozzle. In some embodiments, the formulation comprises four or more parts, and passing a formulation through the print head involves flowing at least four of the four or more parts of the formulation through a respective material inlet of four or more material inlets into the printing nozzle.

In some embodiments, the formulation comprises molecules that have a UV-curable functional group. In some embodiments, the formulation comprises molecules that have a functional group curable by means other than UV exposure. In some embodiments, the formulation comprises molecules that have a UV-curable functional group, and molecules that have a functional group curable by means other than UV exposure. In some embodiments, some of the molecules that have the UV-curable functional group also have a functional group curable by means other than UV exposure. In some embodiments, the formulation comprises molecules that have an isocyanate functional group. In some embodiments, the formulation comprises molecules that have one or more of an alcohol functional group or an amine functional group. In some embodiments, the formulation comprises molecules that have an alkene functional group and molecules that have one or more of an alcohol functional group, an amine functional group, or an isocyanate functional group. In some embodiments, the formulation (e.g., mixture) comprises alkene groups, isocyanate groups, a photoinitiator, and at least one of alcohol groups or amine groups.

In some embodiments, the method comprises mixing two or more parts of the formulation together to form a mixture that comprises alkene groups (e.g., acrylates, methacrylates, vinyls, etc.), isocyanate groups, a photoinitiator, and at least one of alcohol groups or amine groups. In some embodiments, the method comprises exposing the mixture to light (e.g., UV light) at a wavelength within the absorption spectrum of the photoinitiator (e.g., between or equal to 365 nm and 405 nm). In some such embodiments, the alkene groups in the mixture react with one another to increase the viscosity of the mixture.

The print head may comprise a compressed gas source, a printing nozzle, and/or two or more material inlets in fluid communication with the printing nozzle. In some embodiments, an outlet of the printing nozzle is configured to intersect with an outlet fluidly connected to the compressed gas source. In some embodiments, the print head comprises an ultraviolet (UV) light source adjacent to the printing nozzle. In some embodiments, the printing nozzle comprises a mixing chamber and an impeller disposed in the mixing chamber. In some embodiments, the two or more material inlets are in fluid communication with the mixing chamber.

In some embodiments, the mixture continues to increase in one or more of viscosity, strength, yield stress, or stiffness after UV exposure is finished as a result of reaction between molecules in the mixture that have a functional group curable by means other than UV exposure (e.g., between molecules in the mixture that have isocyanate groups and one or more of alcohol groups and amine groups). In some embodiments, the mixture does not have a yield stress when it reaches an outlet of the printing nozzle (e.g., outlet of the mixing chamber), prior to exposure to UV light. In some embodiments, the mixture develops a yield stress within 2 seconds after exposure to UV light. In some embodiments, the formulation (e.g., the mixture) also includes a photo-latent base, which may act as a catalyst that becomes more active upon exposure to UV irradiation to induce faster reaction of any functional groups in the formulation curable by means other than UV irradiation. The term photo-latent base as used herein refers to a molecule that changes structure in response to UV light to become a new molecule with a larger pKa (logarithmic acid dissociation constant).

In some cases, as discussed herein, a foam precursor, prior to curing, may have different rheological properties than the starting raw materials without gas content. For example, a mixture of low viscosity fluids, gases, and/or surfactants, etc. having Newtonian flow behavior before foaming can be used to produce a precursor having non-Newtonian flow characteristics, e.g., with a yield stress, or shear-thickening or shear-thinning behavior. This may be used herein to produce a precursor having a rheological profile suitable for printing, e.g., on a substrate. Fluids such as incompressible Newtonian fluids or gases can be controlled introduced into a nozzle (e.g., prior to mixing) and precisely metered onto a substrate during deposition. In some cases, the foaming process may start within the nozzle, and controlled to control deposition of the precursor and/or the final mechanical properties of the foam.

In some embodiments, one or more materials deposited onto a substrate (e.g., a material deposited by a print head such as a nozzle, a material printed by a 3D-printing process, a component of a 3D-printed article, a portion of a 3D-printed article) may comprise reactive functional groups for a period of time after deposition. The reactive functional groups may be configured to react with other articles to which the deposited material is adjacent (e.g., articles of footwear, components of articles of footwear, materials deposited by a print head such as a nozzle, materials printed by a 3D-printing process, components of 3D-printed articles, portions of 3D-printed articles), such as an article onto which the material was deposited, an article added to the deposited material, an article positioned beside the deposited material, an article disposed on the same article onto which the material was deposited, and/or an article that is positioned partially above or below the deposited material and partially beside the deposited material. Although many of the articles referred to herein are articles of footwear or components thereof, it should be understood that articles of apparel such as sports bras and components of articles of apparel such as sports bras are also contemplated herein. Reaction between the reactive functional groups in the deposited material and one or more articles to which it is adjacent may result in bond formation between the deposited material and the articles(s), and/or may increase the adhesive strength between the deposited material and the article(s). Examples of such articles include textiles, molded parts, layers, portions, further deposited materials with the same or different chemistry, and the like. In some embodiments, the deposited material may bond with two or more articles to which it is adjacent, and may adhere these articles together through bonds formed by reaction of the reactive functional groups in the deposited material with the articles. Each article adhered together may comprise a deposited material (e.g., a 3D-printed article may be built up by successively depositing layers of materials comprising reactive functional groups on top of each other), some of the articles adhered together may comprise a deposited material (e.g., a deposited material may adhere another deposited material to which it is adjacent to a textile on which they are both disposed), or none of the articles adhered together may comprise a deposited material. In some cases, the articles adhered together may have different physical or chemical properties (e.g., different values of toughness, different values of Young's modulus, different values of other properties described below).

In some embodiments, reactive functional groups that are configured to react with an article to which a deposited material (e.g., a material deposited by a print head such as a nozzle, a material printed by a 3D-printing process, a component of a 3D-printed article, a portion of a 3D-printed article) is adjacent (e.g., an article of footwear, a component of an article of footwear, a material deposited by a print head such as a nozzle, a material printed by a 3D-printing process, a component of a 3D-printed article, a portion of a 3D-printed article) may also be configured to react with other reactive functional groups in the deposited material. Reaction between two complementary sets of functional groups within the deposited material may comprise curing of the material. As the deposited material cures, the number of reactive functional groups within the deposited material may be reduced and the deposited material may become less reactive with any articles to which it is adjacent. In certain cases, tuning the curing time of the deposited material by varying one or more parameters (e.g., temperature at which the deposited material is held after deposition, composition of the deposited material) may be advantageous because it may allow for tuning of the reactivity of the deposited material as a function of time. For example, the curing time may be tuned so that the deposited material is adhesive upon deposition and upon further addition of a second article to the deposited material, but is no longer adhesive during further manufacturing steps and/or when an article of which the deposited material is a part of is in use.

A variety of suitable reactive functional groups and molecules comprising reactive functional groups may be included in a deposited material (e.g., a material deposited by a print head such as a nozzle, a material printed by a 3D-printing process, a component of a 3D-printed article, a portion of a 3D-printed article). In some embodiments, a deposited material may comprise reactive functional groups that are alcohol groups and reactive functional groups that are isocyanate groups, and the alcohol groups and isocyanate groups may react to form a polyurethane. In some embodiments, a deposited material may comprise reactive functional groups that are amine groups and reactive functional groups that are isocyanate groups, and the alcohol groups and isocyanate groups may react to form polyureas. In some embodiments, a deposited material may comprise reactive functional groups that are amine groups, reactive functional groups that are alcohol groups, and reactive functional groups that are isocyanate groups; in this case, the isocyanate groups may react with the amine groups and the alcohol groups to form a polyurethane/polyurea hybrid formulation). Further non-limiting examples of suitable reactive functional groups include hydroxyl groups, isocyanate groups, amine groups, glycidyl groups, epoxide groups such as cycloaliphatic epoxy groups, vinyl groups, methyl groups, siloxane groups, catalysts such as platinum catalysts and tin catalysts, acrylate groups, methacrylate groups, and photoinitiators.

The deposited material may have a composition as described elsewhere herein (e.g., compositions for polyurethanes described elsewhere herein). In some embodiments, the deposited material may comprise one or more of a polyurethane, a polyurea, a polyurethane/polyurea hybrid formulation, a silicone, and an epoxy. Further non-limiting examples of molecules comprising reactive functional groups are also listed below. Non-limiting examples of suitable comprising molecules comprising alcohol groups include difunctional hydroxyl compounds such as 1,4-butanediol, hydroquinone bis(2-hydroxylethyl) ether, neopentyl glycol, diethanolamine, and methyldiethanolamine; trifunctional hydroxyl compounds such as trimethylolpropane, 1,2,6-hexanetriol, and triethanolamine; tetrafunctional hydroxyl compounds such as pentaerythritol; and polyols such as polyether polyols, polyester polyols, polytetrahydrofuran, polycaprolactone polyols, polycarbonate polyols, and polytetramethylene ether glycol-based polyols. Non-limiting examples of suitable molecules comprising amine groups include difunctional amine compounds such as diethyltoluenediamine and dimethylthiotoluenediamine. Non-limiting examples of suitable molecules comprising isocyanate groups include methylenebis(phenyl isocyanate), toluene diisocyanate, hexamethylene diisocyanate, naphthalene diisocyanate, methylene bis-cyclohexylisocyanate, and isophorone diisocyanate. Other types of reactive functional groups, and other types of molecules comprising reactive functional groups are also possible.

In some embodiments, a deposited material (e.g., a material deposited by a print head such as a nozzle, a material printed by a 3D-printing process, a component of a 3D-printed article, a portion of a 3D-printed article) may be cured (and/or configured to be cured) at room temperature. In some embodiments, the deposited material may be cured (and/or configured to be cured) at a temperature above room temperature. The deposited material may be configured (and/or configured to be cured) to be cured at a temperature of greater than or equal to 70° C., greater than or equal to 80° C., greater than or equal to 90° C., or greater than or equal to 100° C. The deposited material may be cured (and/or configured to be cured) at a temperature of less than or equal to 110° C., less than or equal to 100° C., less than or equal to 90° C., or less than or equal to 80° C. Combinations of the above-referenced ranges are also possible (e.g., greater than or equal to 70° C. and less than or equal to 110° C.). Other ranges are also possible.

A deposited material (e.g., a material deposited by a print head such as a nozzle, a material printed by a 3D-printing process, a component of a 3D-printed article, a portion of a 3D-printed article) may be cured (and/or configured to be fully cured) over any suitable period of time. In some embodiments, the deposited material is fully cured (and/or configured to be cured) over a period of time of greater than or equal to 15 minutes, greater than or equal to 30 minutes, greater than or equal to one hour, greater than or equal to two hours, greater than or equal to four hours, greater than or equal to eight hours, greater than or equal to 12 hours, greater than or equal to 20 hours, greater than or equal to 24 hours, greater than or equal to 36 hours, greater than or equal to 48 hours, greater than or equal to three days, greater than or equal to four days, greater than or equal to five days, or greater than or equal to six days. In some embodiments, the deposited material is fully cured (and/or configured to be fully cured) over a period of time of less than or equal to one week, less than or equal to six days, less than or equal to five days, less than or equal to four days, less than or equal to three days, less than or equal to 48 hours, less than or equal to 36 hours, less than or equal to 24 hours, less than or equal to 20 hours, less than or equal to 12 hours, less than or equal to eight hours, less than or equal to four hours, less than or equal to two hours, less than or equal to one hour, less than or equal to 30 minutes, or less than or equal to 15 minutes. Combinations of the above-referenced ranges are also possible (e.g., greater than or equal to 15 minutes and less than or equal to one week, greater than or equal to two hours and less than or equal to 20 hours, or greater than or equal to 24 hours and less than or equal to one week). Other ranges are also possible. In general, higher curing temperatures result in faster reactions between reactive functional groups. This may cause the time over which the deposited material is fully cured (and/or configured to be fully cured) to decrease.

For example, a material may be fully cured over a period of time of greater than or equal to a few days and less than or equal to one week when cured at room temperature but may be fully cured over a period of time of greater than or equal to two hours and less than or equal to 20 hours at a temperature of greater than or equal to 70° C. and less than or equal to 110° C.

A deposited material (e.g., a material deposited by a print head such as a nozzle, a material printed by a 3D-printing process, a component of a 3D-printed article, a portion of a 3D-printed article) may be deposited at any degree of curing. In some embodiments, the deposited material is at least 25% uncured upon deposition, at least 30% uncured upon deposition, at least 40% uncured upon deposition, at least 50% uncured upon deposition, at least 60% uncured upon deposition, at least 70% uncured upon deposition, at least 80% uncured upon deposition, or at least 90% uncured upon deposition. In some embodiments, the deposited material is at most 95% uncured upon deposition, at most 90% uncured upon deposition, at most 80% uncured upon deposition, at most 70% uncured upon deposition, at most 60% uncured upon deposition, at most 50% uncured upon deposition, or at most 40% uncured upon deposition. Combinations of the above-referenced ranges are also possible (e.g., at least 30% uncured upon deposition and at most 95% uncured upon deposition). Other ranges are also possible.

In some embodiments, an article (e.g., an article of footwear, a component of an article of footwear) is positioned adjacent to a deposited material (e.g., deposited on the deposited material, deposited adjacent the deposited material, laminated to the deposited material, etc.) before it has fully cured. The article may be positioned adjacent to the deposited material (e.g., a material deposited by a print head such as a nozzle, a material printed by a 3D-printing process, a component of a 3D-printed article, a portion of a 3D-printed article) before at least 25% of the deposited material has cured, before at least 30% of the deposited material has cured, before at least 40% of the deposited material has cured, before at least 50% of the deposited material has cured, or before at least 60% of the deposited material has cured. The article may be positioned adjacent to the deposited material before at most 70% of the deposited material has cured, before at most 60% of the deposited material has cured, before at most 50% of the deposited material has cured, before at most 40% of the deposited material has cured, or before at most 30% of the deposited material has cured. Combinations of the above-referenced ranges are also possible (e.g., before at least 25% of the deposited material has cured and before at most 70% of the deposited material has cured). Other ranges are also possible.

As described herein, an article may be formed by a process involving both one or more 3D-printing steps and one or more non-3D-printing steps. In some embodiments, for example, a first mold (e.g., master mold) may be manufactured by additive manufacturing (e.g., 3D-printing), as described above. A second mold (e.g., secondary mold) may be manufactured, in some embodiments, by one or more 3D-printing steps or non-3D-printing steps. According to certain embodiments, for example, an elastomer may be cast into the first mold (e.g., master mold) to provide a second mold (e.g., secondary mold). Referring, for example, to FIG. 3A, an elastomer is cast into first mold 304, thereby providing second mold 306.

As a result of casting the elastomer in first mold 304 to provide second mold 306, first mold 304 may impart second mold 306 with one or more features provided by the features present in first mold 304. For example, in certain non-limiting embodiments and as shown in FIG. 3A, first mold 304 may be a positive master mold having a texture comprising one or more protrusions. In some such embodiments, casting an elastomer in first mold 304 provides second mold 306 (e.g., negative secondary mold) having a texture comprising one or more cavities.

In certain embodiments, the elastomer and/or the second mold resulting from casting the elastomer may comprise any of a variety of suitable materials. For example, in some embodiments, the elastomer and/or the second mold resulting from casting the elastomer comprise silicone, an epoxy, an acrylate, polyurethane, and/or polyurea. In some embodiments, it may be advantageous to form the second mold (e.g., negative secondary mold) out of silicone or another low surface energy elastomer, such that the subsequent curable liquid that is dispensed into the second mold may be readily removed (i.e., after curing), without the need for a mold release agent.

The casted elastomer may have a hardness of any of a variety of suitable values. In some embodiments, for example, the casted elastomer has a hardness greater than or equal to 10 Shore A, greater than or equal to 20 Shore A, greater than or equal to 30 Shore A, greater than or equal to 40 Shore A, greater than or equal to 50 Shore A, greater than or equal to 60 Shore A, greater than or equal to 70 Shore A, or greater than or equal to 80 Shore A. In some embodiments, the casted elastomer has a hardness less than or equal to 90 Shore A, less than or equal to 80 Shore A, less than or equal to 70 Shore A, less than or equal to 60 Shore A, less than or equal to 50 Shore A, less than or equal to 40 Shore A, less than or equal to 30 Shore A, or less than or equal to 20 Shore A. Combinations of the above recited ranges are also possible (e.g., the casted elastomer has a hardness greater than or equal to 10 Shore A and less than or equal to 90 Shore A).

According to certain embodiments, the method of manufacturing may comprise dispensing a curable liquid into the second mold (e.g., negative secondary mold) through a printing nozzle disposed on a robotic gantry. Referring to FIG. 3C, for example, printing nozzle 316a may dispense curable liquid 318 into second mold 306.

As explained herein, the second mold may be digitally filled with the curable liquid, according to some embodiments. For example, printing nozzle 316a and/or the robotic gantry may be in electronic communication with a computer program that generates machine instructions that can be provided to printing nozzle 316a and/or the robotic gantry to accurately dispense the curable liquid 318 into second mold 306. Accordingly, the robotic gantry may be configured to move printing nozzle 318 relative to second mold 306, in some embodiments.

It may be advantageous, in some embodiments, to dispense the curable liquid to fill the second mold (e.g., one or more cavities of the second mold) in multiple steps. Dispensing the curable liquid in multiple steps may create variations in color or variations in properties of the resulting cured material. In some embodiments, for example, a curable liquid with a first composition (e.g., a first color) may be dispensed and allowed to at least partially cure in a first portion of the second mold, followed by dispensing a curable liquid with a second composition (e.g., a second color) into one or more second portions of the second mold. Dispensing the curable liquid in this fashion may advantageously provide color differences and/or compositional differences between the first portion of the second mold and the second portion of the second mold that do not mix and/or diffuse together.

The curable liquid may comprise any of a variety of suitable materials. In some embodiments, for example, the curable liquid comprises polyurethane and/or polyurea. In some embodiments, the curable liquid may comprise more than one component. For example, in certain non-limiting embodiments, the curable liquid comprises at least one isocyanate prepolymer blended with at least one polyol blend to create polyurethanes with variations in material property and color. The curable liquid may comprise a catalyst, in certain embodiments, which, without wishing to be bound by theory, may facilitate the rate of curing the curable liquid.

In certain embodiments, the second mold may be placed onto a rigid base prior to dispensing the curable liquid. Referring, for example, to FIG. 3C, second mold 306 may be placed onto a rigid base which may, in some embodiments, be clamshell fixture 308. In certain embodiments, receiving substrate 314 (e.g., a textile) may be aligned on a second portion of clamshell fixture 308, as shown in FIG. 3C. One or more fasteners (e.g., pins) may be used to secure receiving substrate 314 on the second portion of clamshell fixture 308.

According to certain embodiments, the curable liquid may be at least partially cured to provide an at least partially cured material. Referring, for example, to FIG. 3C, clamshell structure 308 may be closed such that receiving substrate 314 contacts curable liquid 318. In certain non-limiting embodiments, curable liquid 318 may be at least partially cured using, for example, heat press 320, thereby providing at least partially cured material 319. As a result of at least partially curing curable liquid 318 (e.g., using heat press 310), at least partially cured material 319 may adhere to receiving substrate 314 (e.g., textile) during the curing process. In certain embodiments, it may be advantageous to have a first curing stage that gels curable liquid 318 prior to transfer to receiving substrate 314 (e.g., textile), and a second stage of curing that adheres (e.g., bonds) at least partially cured material 319 to receiving substrate 314 (e.g., textile).

In some embodiments, the curable liquid has undergone a chemical or physical change to induce the formation of one or more bonds (e.g., covalent bonds, ionic bonds) between one or more components of the material to provide the at least partially cured material. In some embodiments, for example, the formation of one or more bonds between one or more components of the material may be a crosslinking reaction between one or more components of the material. In some embodiments, for example, the formation of one or more bonds between one or more components of the material may be a chain extension reaction in which the average molecular weight of the polymer chains increases. In certain embodiments, an at least partially cured material may be cured such that the at least partially cured material behaves like a gel, a viscoelastic liquid, a viscoelastic solid, or an elastic solid solid. The at least partially cured material may, in some embodiments, be partially cured, but not fully cured. According to some other embodiments, the at least partially cured material may be substantially fully cured.

The at least partially cured material may have an increased viscosity as a compared to the curable liquid. In some embodiments, for example, the viscosity of the at least partially cured material may have increased by at least 10%, at least 100%, at least 1,000%, at least 2,500%, at least 5,000%, at least 7,500%, at least 10,000%, at least 15,000%, at least 20,000%, or at least 25,000% compared to the curable liquid. The viscosity of the at least partially cured material may be determined using, for example, a rheometer.

In some embodiments, the curable liquid that is dispensed into the second mold be cured by any of a variety of mechanisms (or dual mechanisms). FIG. 3C, shows, for example, use of hot press 320, but other curing mechanisms are also possible as the disclosure is not meant to be limited in this regard.

In certain embodiments, for example, the second mold may be filled (e.g., digital filled) with a curable liquid that is at least partially UV-curable, and the curable liquid may be exposed to UV light to cure (e.g., gel) the curable liquid. The at least partially cured material may then be hot-pressed onto a receiving substrate (e.g., textile) to thermally cure the remainder of the material, thereby causing the cured material to adhere to the receiving substrate.

In another embodiment, an effective amount of a first catalyst may enable the curable liquid to cure into a gel-like state (e.g., at room temperature). Once the curable liquid is at least partially cured, the at least partially cured material is hot-pressed to activate a second, heat activated catalyst that accelerates the rate of curing, thereby causing the at least partially cured material to adhere to the receiving substrate.

In yet another embodiment, a two-stage cure may be employed, in which the curable liquid comprises materials that react at different rates, such that a first set of reactions occur at a relatively fast rate, and a second set of reactions occur at a relatively slow rate. In some embodiments, for example, the curable liquid may comprise a polyurethane or polyurea system. In other embodiments, a blend of isocyanates may be used. For example, a methylene diphenyl isocyanate (MDI)-based isocyanate prepolymer may react at the first stage of curing, and an aliphatic isocyanate prepolymer may react at the second stage of curing. In other embodiments, polyols or polyamines may be used to create a two-stage curing system. For example, a primary alcohol or primary amine may react at a first stage of curing and a secondary or tertiary alcohol or amine may react at a second stage of curing. In yet other embodiments, a primary or secondary amine may react at a first stage of curing, and a primary, secondary, or tertiary alcohol may react at the second stage of curing. A combination of the above strategies may also be employed.

In yet another embodiment, a curable liquid comprising a thermoplastic material may be employed. The thermoplastic may, in some embodiments, be heated above its melting temperature and mixed with the curable liquid. The liquid mixture of the curable liquid and the thermoplastic may be dispensed into the second mold at an elevated temperature, and then allowed to cool to solidify or gel. Once gelled or partially solidified, the material may then be hot-pressed onto the receiving substrate and fully cured.

Figure 3D:
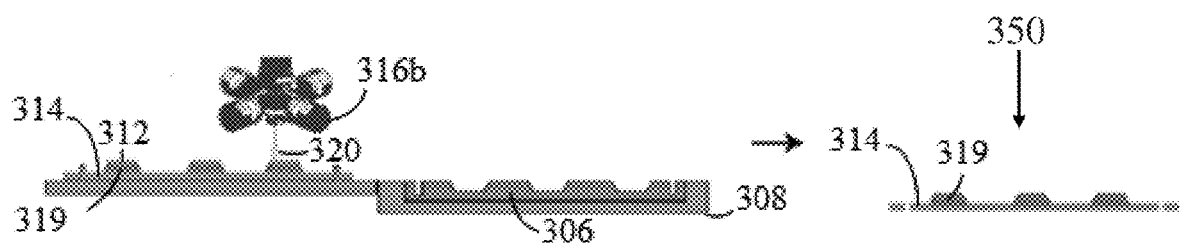

Referring to FIG. 3D, at least partially cured material 319 may be transferred from second mold 306 to receiving substrate 314 such that at least partially cured material 319 is adhered to receiving substrate 314. The receiving substrate may comprise a textile, leather, or polymer, according to some embodiments. As explained above, when transferring at least partially cured material 319 from second mold 306 to receiving substrate 314, it may be advantageous for at least partially cured material 319 to be cured to a point such that at least partially cured material 319 behaves as a solid, but has not reached its full material properties. In this way, at least partially cured material 319 may partially penetrate a surface of receiving substrate 314 without bleeding through the receiving substrate.

The at least partially cured material may be pressed against the receiving substrate for any of a variety of suitable times in order to adhere the at least partially cured material to the receiving substrate. In some embodiments, for example, the at least partially cured material is pressed against the receiving substrate for a period of at least five seconds, at least thirty seconds, at least one minute, at least two minutes, or at least five minutes.

In certain embodiments, at least partially curing and transferring occur substantially simultaneously. Referring, for example, to FIGS. 3C-3D, curable liquid 318 may be at least partially cured, thereby providing at least partially cured material 319 as at least partially cured material 319 is adhering to receiving substrate 314. In some embodiments, transferring at least partially cured material 319 to receiving substrate 314 occurs while at least partially cured material 319 is in second mold 306. According to certain embodiments, at least partially cured material 319 adhered to receiving substrate 314 may be peeled out of second mold 306. In some embodiments, at least partially cured material 319 is substantially fully cured after transferring. FIG. 3D shows, according to some embodiments, article 350 resulting from transferring and adhering at least partially cured material 319 to receiving substrate 314.

According to some embodiments, the curable liquid may have a color that provides a visually desirable appearance without the use of an inkjet. The color may be created, in certain embodiments, through the use of one or more pigments and/or dyes that may be mixed with the curable liquid, or by other means known to a person of ordinary skill in the art.

In certain embodiments, a pigment-containing component may be deposited into the second mold prior to dispensing the curable liquid. Referring, for example, to FIG. 3B, pigment-containing component 311 may be deposited onto second mold 306 prior to dispensing curable liquid 318, thereby forming pigment layer 312. The pigment-containing component may, in some embodiments, be an inkjet ink originating from inkjet 310, according to some embodiments. Curable liquid 318 may dispensed into second mold 306 on pigment layer 312, in some embodiments, and upon curing, pigment layer 312 may be associated with (e.g., bound to) at least partially cured material 319.

According to some embodiments, the inkjet ink may comprise a polymeric composite comprising pigment particles. In some embodiments, the inkjet ink may be UV curable, and may be at least partially cured after inkjetting into/onto the second mold (e.g., the negative secondary mold). In certain embodiments, the inkjet ink may be water-based. In the case of a water-based ink, the ink may be cured with heat, or by waiting a period of time for the water to evaporate after depositing the ink and prior to dispensing the curable liquid into the second mold.

According to some embodiments, a layer (e.g., a thin film) of the curable liquid may be dispensed into the second mold and at least partially cured prior to depositing the one or more pigment-containing components into the second mold. In some such embodiments, a second layer of the curable liquid may be dispensed on the one or more pigment-containing components and the first layer of the at least partially cured liquid, followed by at least partially curing the second layer of the curable liquid.

In some embodiments, a topcoat layer may be deposited on the at least partially cured material after transferring the at least partially cured material to the receiving substrate. Referring, for example, to FIG. 3D, printing nozzle 316a may be used to deposit topcoat 20 on at least partially cured material 319 adhered to receiving substrate 314. In certain embodiments wherein pigment-containing component 311 has been deposited onto second mold 306 prior to dispensing curable liquid 318, as shown in FIG. 3B and described above, topcoat 20 may be deposited on pigment layer 312 associated with (e.g., bound to) at least partially cured material 319 adhered to receiving substrate 314. According to certain embodiments, topcoat 20 may be deposited into second mold 306 prior to dispensing curable liquid 318 and/or pigment-containing component 311.

The topcoat may comprise any of a variety of suitable materials. In some embodiments, for example, the topcoat comprises a polymer (e.g., polyurethane).

According to certain embodiments, at least a portion of the curable liquid may be coated with an adhesive thermoplastic powder. In some embodiments, the curable liquid may be coated with the thermoplastic powder after dispensing the curable liquid into the second mold and before fully curing the curable liquid. For example, the curable liquid may be partially cured to a tacky state, and the thermoplastic powder may deposited onto the partially cured material to coat the tacky surface. In some embodiments, after coating the tacky surface of the at least partially cured material, the at least partially cured material may be further cured at room temperature or at an elevated temperature below the melting point of the thermoplastic powder. In some embodiments, when the curable liquid is mostly solid, the receiving substrate may be placed in contact with thermoplastic powder and then hot-pressed to a temperature above the melting point of the thermoplastic powder, therefore bonding the at least partially cured liquid to the receiving substrate.

The thermoplastic powder may have any of a variety of suitable average characteristic dimensions (e.g., particle diameters). In certain embodiments, for example, the thermoplastic powder comprises particles having a characteristic dimension (e.g., diameter) between greater than or equal to 500 nm and less than or equal to 1 mm.

Utilizing the thermoplastic powder may advantageously circumvent certain issues that may occur when the thermoplastic powder is not employed. In some cases, for example, at least a portion of the curable liquid may start to cure immediately after dispensing and/or before all of the curable liquid has been dispensed into the second mold, resulting in different states of cure. In such cases, the portion of the curable liquid that has solidified may not adhere to the receiving substrate, while the portion of the curable liquid that has not cured bleed through the receiving substrate. Utilizing a thermoplastic powder may advantageously keep the curable liquid from seeping into the receiving substrate (e.g., textile) while ensuring adherence between the at least partially cured material and the receiving substrate.

The thermoplastic powder may be any of a variety of suitable materials. In some embodiments, for example, the thermoplastic powder comprises a polyurethane, a polyester, a polyamide, a polyurea, a polyolefin, and the like.

Another way to avoid certain complications noted above with respect to the curable liquid is to vary the cure rate of the curable liquid using a catalyst. In some embodiments, for example, a concentration of the catalyst in the curable liquid may be varied between a first portion of the composition and a second portion of the composition (e.g., by at least 10%, as explained herein in greater detail).

In some embodiments, for example, a multi-input active mixing printhead may be used to vary the concentration of catalyst in the curable liquid. An exemplary non-limiting four-input system may be used, for example, where input one is for an isocyanate prepolymer, input two is for dosing a catalyst heavy polyol solution, input three is for dosing a low molecular weight polyol/chain extender blend (e.g., for increasing stiffness), and input four is for dosing a high molecular weight polyol blend (e.g., for reducing stiffness). The gel time for the formulations at various catalyst concentrations may be determined by a rheometer, or by other methods known to a person of ordinary skill in the art. In certain embodiments, a lookup table may be created that indicates, for example, the approximate gel time for a material at a given stiffness and a given catalyst concentration. In some such embodiments, points in between measurements can be filled in by fitting a model or using linear interpolation. A print file with defined zonal stiffness can be made and simulated to determine the time within the print that each feature will be deposited into the mold. Then, the catalyst concentration for each feature or region can be adjusted in order to assure that all parts of the print reach the gel point at approximately the same time.

According to some embodiments, the second mold may be configured such that it has prefabricated cavities for objects that are intended to be adhered to the receiving substrate and/or partially or completely embedded in the at least partially cured material. In certain non-limiting embodiments, for example, a rigid eyelet piece may be inserted into a cavity of the second mold (e.g., negative secondary mold) and then the curable liquid may be dispensed onto the rigid eyelet piece during the process of filling (e.g., digitally filling) the second mold. Other types of parts that could be incorporated include, but are not limited to, thermoplastic sheets, wires, electronics, batteries, connectors, computer chips, lights, fibers, and the like.

In various aspects, a variety of 3D-printed articles such as foams and/or elastomers as well as other products may be produced. For example, in some embodiments, a foam may be created from a foam precursor comprising a polymer and a cross-linking agent. The polymer can comprise polyol with a low or high average molecular weight such as a low number average molecular weight diol, high number-average molecular weight diol, a low number-average molecular weight triol, a high number-average molecular weight triol, or a high number-average molecular weight monol. For instance, a high molecular weight monol, diol, or triol may have a number-average molecular weight of greater than 300, 400, or 500, while a low molecular weight monol, diol, or triol may have a number-average molecular weight less than 300, 400, or 500. For instance, the monol, diol, or triol may have a number-average molecular weight less than 500 or greater than 6000. In some embodiments, a polyol may comprise more than three alcohol groups. For instance, it may comprise four, five, six, seven, or more alcohol groups. Other examples of polymers include, but are not limited to, polyureas, polyurethane/polyurea hybrid formulations, epoxies, acrylates, cyanate esters, silicones, polyesters, phenolics, hydrogels, or the like.

In one set of embodiments, the polymer includes a polyurethane, e.g., formed by reacting the polyol with an isocyanate. The polyol may be any suitable polyhydroxy compound. For example, the polyol may be a hydroxy-terminated ester, ether or carbonate diol. Non-limiting examples of polyalkylene ether glycols include polyethylene ether glycols, poly-1,2-propylene ether glycols, polytetramethylene ether glycols, poly-1,2-dimethylethylene ether glycols, poly-1,2-butylene ether glycol, and polydecamethylene ether glycols. Examples of polyester polyols include polybutylene adipate and polyethylene terephthalate. Examples of polycarbonate diols include polytetramethylene carbonate diol, polypentamethylene carbonate diol, polyhexamethylene carbonate diol, polyhexane-1,6-carbonate diol and poly(1,6-hexyl-1,2-ethyl carbonate)diol. However, many other suitable polyhydroxy compounds can also be used depending upon the desired application. Any suitable polyol, polythiol or polyamine or mixture thereof that is suitable for this purpose may be used, such as, for example, mixed diols comprising a 2,4-dialkyl-1,5-pentanediol and a 2,2-dialkyl-1,3-propanediol. Specific examples of 2,4-dialkyl-1,5-pentanediols include 2,4-dimethyl-1,5-pentanediol, 2-ethyl-4-methyl-1,5-pentanediol, 2-methyl-4-propyl-1,5-pentanediol, 2,4-diethyl-1,5-pentanediol, 2-ethyl-4-propyl-1,5-pentanediol, 2,4-dipropyl-1,5-pentanediol, 2-isoptopyl-4-methyl-1,5-pentanediol, 2-ethyl-4-isoptopyl-1,5-pentanediol, 2,4-diisopropyl-1,5-pentanediol, 2-isopropyl-4-propyl-1,5-pentanediol, 2,4-dibutyl-1,5-pentanediol, 2,4-dipentyl-1,5-pentanediol, 2,4-dihexyl-1,5-pentanediol, and the like. Specific examples of 2,2-dialkyl-1,3-propanediols include 2,2-dipentyl-1,3-propanediol, 2,2-dihexyl-1,3-propanediol and the like.

In some cases, longer-chain or higher molecular weight polyols may be used to produce relatively softer materials because they have more polyol relative to isocyanate. In some cases, the isocyanate can also be underindexed compared to the number of reactive sites on the polyol to make a softer foam that behaves less elastically.

The cross-linking agent, if present, can comprise an isocyanate in some cases, and/or an isocyanate prepolymer. An isocyanate may have more than one functional isocyanate group per molecule and may be any suitable aromatic, aliphatic or cycloaliphatic polyisocyanate. In some cases, the isocyanate is a diisocyanate. One non-limiting example is an organic diisocyanate. Additional examples of organic diisocyanates include 4,4'-diisocyanatodiphenylmethane, 2,4'-diisocyanatodiphenylmethane, isophorone diisocyanate, p-phenylene diisocyanate, 2,6-toluene diisocyanate, polyphenyl polymethylene polyisocyanate, 1,3-bis(isocyanatomethyl)cyclohexane, 1,4-diisocyanatocyclohexane, 1,6-hexamethylene diisocyanate, 1,5-naphthalene diisocyanate, 3,3'-dimethyl-4,4'-biphenyl diisocyanate, 4,4'-diisocyanatodicyclohexylmethane, 2,4'-diisocyanatodicyclohexylmethane, and 2,4-toluene diisocyanate, or combinations thereof.

In some embodiments, the foam precursor comprises a polyurethane, a polyurea, a polyurethane/polyurea hybrid formulation, an epoxy, a silicone, a cyanoacrylate, an adhesive, a cyanate ester, a polyester, a polyimide, a phenolic, or another suitable material.

In some cases, an isocyanate prepolymer may be used, e.g., in addition to and/or instead of an isocyanate. For instance, where two isocyanates are added to the ends of a polyol, so it still has functionality of two, but with a higher molecular weight.

In addition, it should be understood that a cross-linking agent is not required. For example, in some embodiments a polymer (such as a thermoplastic polyurethane) can be mixed with fillers and frothed in a nozzle or a mixing chamber, then cooled upon exiting to form a foam.

In some embodiments, no foam is produced and a cross-linked product results. As a non-limiting example, a high number-average molecular weight diol may be mixed with an isocyanate (e.g., a diisocyanate, or other isocyanates described herein) and deposited onto a substrate, e.g., to produce a thermoplastic elastomer. In another embodiment, a low number-average molecular weight diol can be mixed with an isocyanate and deposited onto a substrate, e.g., to produce a rigid thermoplastic. In yet another embodiment, a high number-average molecular weight diol and a high number-average molecular weight triol can be mixed, and then the polyol mixture mixed with an isocyanate and deposited onto a substrate, e.g., to produce a flexible thermosetting elastomer with high resiliency.

In some embodiments, the foam precursor comprises a polyurethane, a polyurea, a polyurethane/polyurea hybrid formulation, an epoxy, a silicone, a cyanoacrylate, an adhesive, a cyanate ester, a polyester, a polyimide, a phenolic, or another suitable material. In another embodiment, the foam precursor could comprise a decomposeable binder and particles which stabilize the bubble interface. In some cases, the particles may be sintered at the bubble interface to form a non-polymeric foam, e.g., a metal foam or a ceramic foam.

As a non-limiting example of a foam, in one embodiment, a high number-average molecular weight diol and a high number-average molecular weight triol are mixed with a surfactant, and then the polyol-surfactant mixture is mixed with an isocyanate. The foam precursor that results may be mixed with nitrogen, or another gas, and deposited onto a substrate. Mixing techniques such as those discussed herein, e.g., involving more than one stage of mixing or combining fluids, may be used.

As yet another non-limiting example, a high number-average molecular weight diol and a high number-average molecular weight monol are mixed with a surfactant, and then the polyol-surfactant mixture is mixed with an isocyanate. Mixing techniques such as those discussed herein, e.g., involving more than one stage of mixing or combining fluids, may be used. The foam precursor that results is then mixed with nitrogen, or another gas, and deposited onto a substrate. This may be used to produce memory foam, or other types of foam.

As still additional non-limiting examples of foams, a high number-average molecular weight diol may be mixed with an isocyanate and deposited onto a substrate, e.g., to produce a thermoplastic elastomer. In another embodiment, a low number-average molecular weight diol can be mixed with an isocyanate and deposited onto a substrate, e.g., to produce a rigid thermoplastic. In yet another embodiment, a high number-average molecular weight diol and a high number-average molecular weight triol can be mixed, and then the polyol mixture mixed with an isocyanate and deposited onto a substrate, e.g., to produce a flexible thermosetting elastomer with high resiliency.

As mentioned, in some embodiments, a surfactant may be used to produce a foam or 3D-printed article as discussed herein. For example, a surfactant may be used to facilitate the introduction of gas into a fluid, the subsequent stability of the bubbles that are formed, and/or the rheology of the foam can be altered or tuned using various surfactants, or altering their concentration, etc. For instance, in one embodiment, a surfactant may be used that comprises a first moiety with affinity for an air-liquid interface, e.g., to facilitate the introduction of gas into a fluid. Non-limiting examples of such surfactants include sodium stearate, sodium dodecyl sulfate, or silicone-based surfactants such as silicone polyethers. Many such surfactants are widely available commercially.

In some cases, a surfactant molecule may be used that allows production of a high yield stress foam, e.g., a foam able to maintain its shape after deposition on a substrate. For example, in some embodiments, a high-yield stress inducing surfactant is one where the end of the surfactant is more soluble in the continuous phase of the foam precursor. The surfactant may have a relatively high molecular weight, and may be non-ionic. Non-limiting examples of such surfactants include surfactants with a molecular weight of greater than or equal to 1500 Daltons. In addition, in some cases, a surfactant molecule may be used that allows production of a low yield stress foam, e.g., a foam unable to maintain its shape after deposition on a substrate, and the foam may conform to the material around it after deposition. In some embodiments, a low-yield stress inducing surfactant is one where the soluble end may be either charged or have a relatively low molecular weight, e.g., such that no entanglement between the surfactants is able to occur. Non-limiting examples of such surfactants include surfactants with a low molecular weight (e.g., silicone surfactants with a low molecular weight). In addition, in some embodiments, different types of surfactants may be used, e.g., a high yield and a low yield surfactant. By varying the relative concentration of the first surfactant and the second surfactant in the mixture, the resultant foam may vary from high yield stress to low or no yield stress, depending upon the application.

In certain embodiments, the first surfactant molecule may comprise a first moiety having an affinity for an air-liquid interface, and a second moiety that comprises a long chain that is soluble in the foam precursor and prone to entanglement. The second surfactant molecule may, in some instances, comprise the same first moiety with affinity for the air-liquid interface, and a second moiety that comprises a short chain with an electrostatic charge. The electrostatic charge may in some cases be such that the cells of the closed-cell foam repel one another and can move freely past one another.

The cell-forming agent, in some embodiments, forms cells within a material such as a foam or froth, as discussed herein. For instance, the cell-forming agent may comprise water, and/or a gaseous material such as air, carbon dioxide, nitrogen, butane, or the like. In some embodiments, the cell-forming agent comprises a blowing agent that is added that can generate a gas, e.g., chemically. The microfluidic printing nozzle may disperse the blowing agent in a material, for example a polymer, to form a two-phase mixture of blowing agent cells within the polymer. Thus, the blowing agent can comprise a material that decomposes into a gas, e.g., at an elevated temperature. In some cases, the blowing agent can comprise a gaseous material that maintains its liquid state by cooling or pressurization, and reverts to its native gas state when the pressure is released or the blowing agent is heated, which may cause the blowing agent to form a gas, e.g., to cause cells in the polymer to grow. The resultant gas may become trapped in cells within the material, e.g., forming a foam.

As an example of use of a blowing agent, the microfluidic printing nozzle may mix a blowing agent with a material, for example a polymer, which may undergo a chemical reaction to cause the formation of a gas. Chemical blowing agents may include generally low molecular weight organic compounds that decompose to release a gas such as nitrogen, carbon dioxide, or carbon monoxide. Non-limiting examples of chemical blowing agents include azo compounds such as azodicarbonamide. In some cases the blowing agent may be activated on the surface (e.g., selectively on the surface) to produce a rough surface finish, to impart a matte finish, and/or to provide a soft feel to the exterior of a print.

Thus, in some cases, the blowing agent can be used to create foams that form cells by induction by heat, removal of pressure, or the like. For instance, a foam precursor can be mixed with the blowing agent and deposited onto a substrate or part without forming cells until after deposition, or with only partially formed cells. Thus, in some cases, material may be deposited onto a substrate, then induced to form cells by heating the material. After deposition, cells may form within the product, e.g., by induction by heat, removal of pressure, or the like.

As a non-limiting example, a foam may comprise an ethylene-vinyl acetate foam, which may be utilized in footwear or other applications. A blowing agent may be selected such that the agent phase-transitions or decomposes into a gas at a temperature at which the polymer containing it is soft and malleable. In some cases, the polymer can expand (e.g., expand up to 200%) as the cells form without rupturing, and the resultant material can be cooled to form a solid foam.

As another example, water may be used in another embodiment as a cell-forming agent. For example, a water-blown foam may be produced where water and a surfactant are mixed into a polymer component, which is then mixed with isocyanate or another substance able to react with water, e.g., to produce a gas. For instance, as a non-limiting example, isocyanate chemically reacts with both water and polyol; the reaction of polyols with isocyanate may be used to increase the molecular weight of the polymer, e.g., to form a polyurethane, while the reaction of water with the isocyanate forms carbon dioxide gas. The carbon dioxide gas becomes trapped in the polymer as it solidifies, and a foam is thus created. In some cases, the amount of water may be controlled to control the properties of the resulting foam, such as density or cell size, e.g., during the reaction process.

In addition, in some embodiments, a material may be deposited onto a substrate, e.g., to fill a mold, then the mold may be sealed and the blowing agent induced to form a foam, which may then start to fill in the mold as the foam expands.

In some embodiments, a 3D-printed article described herein comprises one or more additives. These additives can comprise particles, hollow glass spheres, polymer spheres, a pigment, a metal, a filler such as a thermally conductive filler, a filler having a relative dielectric constant of at least 5, an ultraviolet stabilizer, a filler concentrate, or another suitable additive. Additional examples of additives include surfactants (e.g., silicone surfactants), catalysts, nucleation promotors, fillers for better abrasion resistance, chemical foaming agents, etc. Combinations of these and/or other additives are also possible. As a non-limiting example, a 3D printed closed-cell foam may be produced that incorporates particulate additives comprising a cellular network of cell walls separating empty cells, where the cell walls comprise a polymer composite including filler particles dispersed in a polymer matrix.

As a non-limiting example, hollow glass spheres and/or polymer spheres may be incorporated into polyurethanes or other polymers as discussed herein to reduce density, increase stiffness, reduce dielectric constant, provide more nucleation sites for bubble formation, or the like. For instance, hollow spheres may be used to decrease weight. Hollow glass spheres can be varied, e.g., spatially, in order to change the properties of the product.

As described above, in certain embodiments a 3D-printed article (e.g., a 3D-printed articles that is a foam such as a closed-cell foam, a 3D-printed article that is not a foam, a 3D-printed article that comprises an elastomer) may comprise at least a first portion and a second portion that interpenetrate. In some embodiments, the first portion may form a skeleton-like structure that spans the second portion. For example, a 3D-printed article may comprise a first portion with a skeleton-like structure that is stiffer than a second portion in which it is embedded. This may be achieved in some cases by varying the stiffness of the material being extruded from a nozzle during a 3D-printing process.

In one aspect, a foam may be printed (e.g., via 3D-printing) into a structure defining a plurality of cells, i.e., into a foam-like structure. Thus, a foam may be printed as part of a larger foam-like structure, e.g., where the walls of the foam-like structure (e.g., defining cells of the foam-like structure themselves are foams having cells. The foam-like structure may have open cells, closed cells, or any combination of open and closed cells, independently of the structure of the foam itself forming the foam-like structure.

In some embodiments, one or more portions of a 3D-printed article as described herein (e.g., a 3D-printed articles that is a foam such as a closed-cell foam, a 3D-printed article that is not a foam, a 3D-printed article that comprises an elastomer) may be responsive to one or more stimuli. For example, the 3D-printed article may comprise a portion that changes shape after printing, such as a portion that is flat directly after printing but curves upwards upon removal from the substrate (e.g., a mold). As another example, the 3D-printed article may comprise a portion that can respond to temperature, such as a portion that can decrease ventilation of the article upon exposure to cold temperatures.

In some embodiments, one or more portions of a 3D-printed article as described herein (e.g., a 3D-printed articles that is a foam such as a closed-cell foam, a 3D-printed article that is not a foam, a 3D-printed article that comprises an elastomer) may comprise one or more cooling channels and/or may comprise one or more ventilation channels.

As described above, certain embodiments relate to methods for 3D printing a mixture onto a substrate. The substrate may be any suitable target for a material exiting a nozzle. In some cases, the substrate is planar, although in other cases, the substrate is non-planar (e.g., curved). For instance, the substrate may be a mold (e.g., the mold of a shoe), to which a material may be introduced. In some cases, the material may be relatively fluid and able to conform to contours within the substrate (e.g., if the substrate is a mold). In some such embodiments, the substrate may have one or more morphological features that are desirable for an external surface of the 3D-printed article (e.g., a desirable surface texture, a desirable curvature). However, in other cases, the material may be relatively solid, e.g., having a defined shape, upon deposition onto the substrate, such as is discussed herein.

In some cases, the substrate may also be heated or cooled, e.g., to promote or inhibit a reaction, to cause solidification to occur, or the like. In some cases, the temperature may be altered by at least 5° C., at least 10° C., or by other ranges such as those discussed herein. Any method may be used to heat or cool the substrate. For example, heat or cooling sources may be used to apply heat or cooling to the substrate, the substrate may be contained within a heated or cooled environment, or a source of a heated or cooled fluid may be used to heat or cool the substrate, e.g., via a heat exchanger). In one embodiment, radiant light or infrared radiation may be applied to the substrate for heating.

In some embodiments, heat may be applied to a substrate (e.g., a mold) after printing in order to cause expansion of the printed material. Expansion may include either or both of thermal expansion and expansion due to foam formation. In some embodiments, heating the substrate may cause expansion of printed material into previously unfilled portions of the substrate.

In one set of embodiments, the nozzle and/or the mixing chamber may be heated or cooled. In some cases, the temperature of mixing may be controlled, for instance, to allow for uniform mixing, to facilitate reaction of fluids therein (e.g., to an optimum or desired temperature), to remove excess heat (e.g., contributed by a chemical reaction, the spinning of an impeller, etc.), or the like. Various methods can be used to add heat or remove heat from the nozzle or the mixing chamber. For example, a heat source may be positioned to deliver heat to the nozzle or mixing chamber, or to one or more fluids entering therein. Examples of heat sources include electrically resistive heaters, infrared light sources, or heating fluids (e.g., which can transmit heat using a heat exchanger or the like). In some cases, more than one heat source may be used. Similarly, a variety of cooling sources can be used in some embodiments to remove heat from the nozzle or mixing chamber. Non-limiting examples include Peltier coolers or cooling fluids (e.g., which can remove heat using a heat exchanger or the like).

Heating and/or cooling may, for example, be used to control mixing and/or reaction within the material, to keep the temperature at substantially the temperature of the surrounding environment (e.g., at room temperature), to prevent the surrounding environmental conditions and/or the heat generated by friction of the impeller and exotherm of the material curing from affecting the reaction or the printing parameters, or the like. In some cases, the temperature may be altered by at least 5° C., at least 10° C., at least 15° C., at least 20° C., at least 30° C., at least 40° C., at least 50° C., at least 60° C., or by other ranges such as those discussed herein. In other embodiments, however, the temperature may be controlled or altered by no more than 20° C., no more than 15° C., no more than 10° C., no more than 5° C., etc. relative to the incoming fluids or the surrounding environmental conditions.

In addition, in some embodiments, one or more sensors may be present, e.g., within the nozzle or mixing chamber, within an outlet, within the substrate, or within sensing communication of the nozzle, mixing chamber, outlet, and/or substrate. Such sensors may be used to determine a property of the incoming fluids, the mixing process, and/or the exiting material, e.g., qualitatively and/or quantitatively. In some cases, such information may be used to control the process, e.g., by controlling the flow of fluid into the nozzle or mixing chamber, the mixing speed (e.g., of an impeller), the flow exiting an outlet, the opening and closing of a valve at the outlet, or the like. Non-limiting examples include temperature sensors (e.g., thermocouples, infrared cameras, or the like), pressure transducers, photodiodes, colorimetric sensors, flow meters, etc. In addition, more than one sensor can be used in some cases.

3D-printed articles for use in footwear may be suitable for use in any type of footwear. Non-limiting examples of footwear include athletic footwear, shoes, sneakers, tennis shoes, basketball shoes, sandals, shoes appropriate for work, boots, booties, footwear comprising a heel of at least one inch, footwear lacking a heel or comprising a heel of less than one inch, boots, booties, basketball shoes, hiking boots, dress shoes, orthotics, bunion orthotics, ski boots and ski boots. Footwear comprising a 3D-printed article as described herein may be appropriate for men, women, and/or children.

The following examples are intended to illustrate certain embodiments of the present invention, but do not exemplify the full scope of the invention.

Example 1

Figure 12:
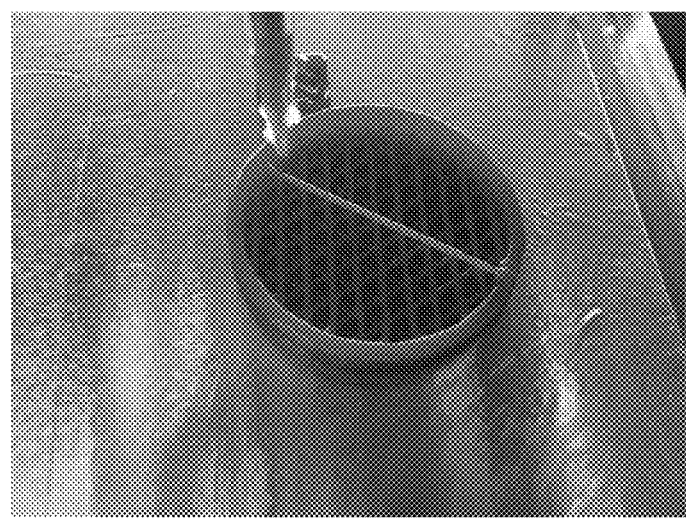
FIGS. 12-15 show several 3D-printed articles according to certain embodiments of the invention.
Figure 13:
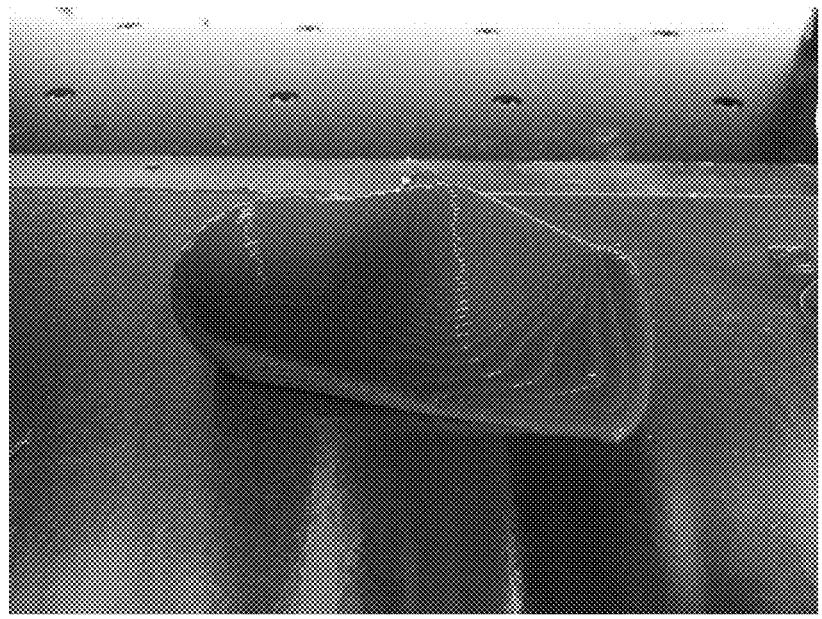
Figure 14:
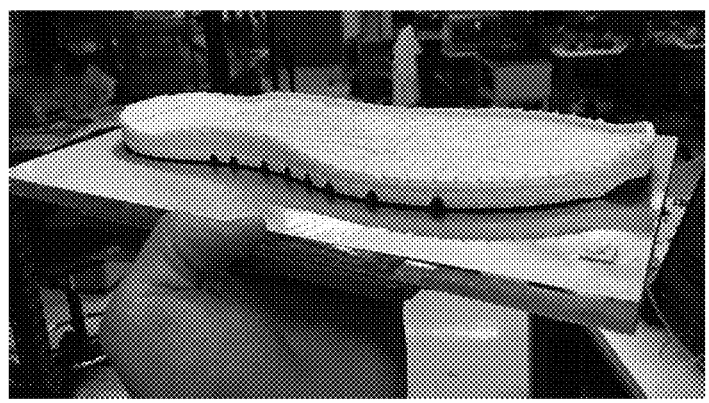
Figure 15:

Various 3D-printed articles were fabricated, and are shown in FIGS. 12-15. FIG. 12 shows a partially enclosed open cell foam, which is surrounded by a layer of continuous material on each of its sides except for its top. FIG. 13 shows a shoe insole printed with 50% infill density on the inside. The articles shown in FIGS. 12-13 were formed from two part polyurethane elastomers. FIGS. 14 and 15 show a 3D-printed article comprising a midsole and an outsole printed in one continuous process from the same mixing nozzle. The outsole comprises a rigid two part polyurethane, and the midsole comprises a two part waterblown polyurethane foam.

Example 2

A prophetic non-limiting example for printing a shoe into a mold is described below. It should be understood that certain steps listed below may be optional even if not listed as such, and that certain inventive methods may further comprise additional steps that are not listed. The following steps may be followed to print a shoe into a mold:

1. Choose an external shoe sole shape based on shoe size and style
2. Select a mold (e.g., a premade mold) made of, e.g., metal or plastic. The mold may have shape and/or alignment features that to aid positioning of a gantry system relative to it.
3. Place the mold on a printer attached to a kinematic coupling or fixture.
4. Prepare machine commands to make the shoe (e.g., machine commands in Gcode)
5. Upload the machine commands to a machine. The code may cause translation of a nozzle in the x-, y-, and/or z-direction. In some cases, the code may cause the nozzle to conformally trace the shape of the mold.
6. Optionally print a color image onto the inside of the mould using an inkjet process, a transfer film process, or a different process. This image may then be picked up by and cured into the materials printed into the mold above the color image. The ink may be pigment coupled to a polyurethane and/or a latent curing agent such as a blocked isocyanate.
7. Conformally print an outsole material into the bottom and sides of the mold. This will be the most exterior portion of the shoe, and will be in direct contact with the ground. The material set used for this may be a polyester polyurethane elastomer with no porosity, a high density polyester polyurethane foam. Non-limiting examples of other options include thermoplastic polyurethanes, or vulcanized natural rubbers.
8. Print a material with high resilience that is stiff yet flexible conformally onto the mold to create one or more features that will be externally visible to the shoe sole. These features may be printed into an arch area of the mold.
9. Print a polyurethane foam into the mold in one or more locations. The foam density, foam rheology, foam expansion after deposition, and foam mechanical properties can be tuned spatially by varying the inputs and impeller parameters of the mixing nozzle as the foam is deposited. The printed structure could be a solid foam, or could have a lattice like architecture where the foam filaments have a macroscopic porous structure, but each filament also has a microscopic porous structure.
10. Print additional rigid and/or flexible materials onto the foam structure to give advanced customized structure and bending properties to the shoe.
11. Optionally, print more foam.

12. After all of the foam has been deposited, cap the mold, raise the temperature of the mold, and drive the foam to expand more. This process may push material firmly against the sides of the mold, may enhance the surface quality of the article, and/or may enhance the resolution of mold features.
13. Remove the top from mold and allow the mold to cool.
14. Print additional materials on top of the piece of the shoe sole that has conformed to the shape of the top of the mold. This process may enable customization of the contour of the sole that comes into direct contact with the foot. Printing the additional materials may comprise printing through a mixing nozzle. In some embodiments, the additional materials may rapidly solidify after extrusion.
15. Optionally, inkjet print a lower viscosity material. The lower viscosity material may bond well to the top of the sole and/or may enhance the smoothness of the sole.
16. Deposit an adhesive onto the printed surface
17. Translate a shoe upper attached to shoe last, and stamp it into the shoe sole and mold. Continue to apply pressure until the adhesive is fully bonded.
18. Use the upper on shoe last to demold the shoe.
19. Transfer the shoe to a 4th rotational axis, or have a stamping mechanism and last already be attached to 4th axis.
20. Scan the shoe using a 3D-scanning system.
21. Print specified patterns conformally on the upper and/or on parts of the shoe sole.
22. Print or fabricate shoe insole insert separately, and place it into the shoe.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed:

1. A method of curing a liquid, comprising:
   dispensing a curable liquid into a mold through a printing nozzle disposed on a robotic gantry, wherein a composition of the curable liquid is varied between at least a first portion of the composition and a second portion of the composition; and
   at least partially curing the curable liquid to provide an at least partially cured material.

2. The method of claim 1, wherein the robotic gantry is configured to move the printing nozzle relative to the mold.

3. The method of claim 1, further comprising depositing a pigment-containing component into the mold prior to dispensing the curable liquid.

4. The method of claim 1, further comprising transferring the at least partially cured material from the mold to a substrate such that the at least partially cured material is adhered to the substrate, thereby providing an article.

5. The method of claim 4, wherein at least partially curing and transferring occur simultaneously.

6. The method of claim 4, wherein the at least partially cured material is fully cured after transferring.

7. The method of claim 4, wherein the substrate comprises a textile, leather, or polymer.

8. The method of claim 1, wherein a tensile elastic modulus of the at least partially cured material is varied by at least 10% between at least a first portion of the at least partially cured material and a second portion of the at least partially cured material.

9. The method of claim 1, wherein the mold comprises an elastomer.

10. The method of claim 1, wherein the mold comprises silicone.

11. The method of claim 1, wherein the curable liquid comprises polyurethane.

12. The method of claim 1, wherein the curable liquid comprises polyurea.

13. The method of claim 1, wherein the curable liquid comprises a catalyst.

14. The method of claim 13, wherein a concentration of the catalyst is varied between the first portion of the composition and the second portion of the composition.

15. A method of manufacturing an article, comprising:
    casting an elastomer into a first mold to provide a second mold;
    dispensing a curable liquid into the second mold;
    at least partially curing the curable liquid to provide an at least partially cured material; and
    transferring the at least partially cured material from the second mold to a substrate such that the at least partially cured material is adhered to the substrate, thereby providing the article.

16. The method of claim 15, further comprising coating at least a portion of the curable liquid with a thermoplastic powder after dispensing the curable liquid into the second mold and before fully curing the curable liquid.

17. The method of claim 15, wherein transferring the at least partially cured material to the substrate occurs while the at least partially cured material is in the second mold.

18. The method of claim 17, further comprising peeling the at least partially cured material adhered to the substrate out of the second mold.

19. The method of claim 15, further comprising depositing a pigment-containing component into the second mold prior to dispensing the curable liquid.

20. A method of manufacturing a colored article, comprising:
    depositing one or more pigment-containing components into a mold;
    dispensing a curable liquid onto the one or more pigment-containing components;
    at least partially curing the curable liquid to provide an at least partially cured material associated with the one or more pigment-containing components; and
    transferring the at least partially cured material associated with the one or more pigment-containing components from the mold to a substrate such that the at least partially cured material associated with the one or more pigment-containing components is adhered to the substrate, thereby providing the colored article.

* * * * *